US011676365B2

(12) United States Patent
Kar et al.

(10) Patent No.: US 11,676,365 B2
(45) Date of Patent: Jun. 13, 2023

(54) EXPLAINABLE ARTIFICIAL INTELLIGENCE (AI) BASED IMAGE ANALYTIC, AUTOMATIC DAMAGE DETECTION AND ESTIMATION SYSTEM

(71) Applicant: ACCENTURE GLOBAL SOLUTIONS LIMITED, Dublin (IE)

(72) Inventors: Indrajit Kar, Bangalore (IN); Mohammed C. Salman, Bangalore (IN); Ankit Vashishta, Faridabad (IN); Vishal D. Pandey, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 745 days.

(21) Appl. No.: 16/715,193

(22) Filed: Dec. 16, 2019

(65) Prior Publication Data
US 2021/0182713 A1 Jun. 17, 2021

(51) Int. Cl.
*G06V 10/44* (2022.01)
*G06N 20/20* (2019.01)
*G06N 3/08* (2023.01)
*G06N 5/045* (2023.01)
*G06F 18/243* (2023.01)
(Continued)

(52) U.S. Cl.
CPC ...... *G06V 10/454* (2022.01); *G06F 18/24317* (2023.01); *G06N 3/08* (2013.01); *G06N 5/045* (2013.01); *G06N 20/20* (2019.01); *G06V 10/464* (2022.01); *G06V 10/764* (2022.01); *G06V 10/82* (2022.01)

(58) Field of Classification Search
None
See application file for complete search history.

(56) References Cited

U.S. PATENT DOCUMENTS 9,524,450 B2    12/2016   Ravindran et al.
10,692,050 B2 *  6/2020   Taliwal ..................... G06T 7/33
(Continued)

OTHER PUBLICATIONS

Hussain et al., A Comprehensive Study of the Effect of Spatial Resolution and Color of Digital Images on Vehicle Classification, IEEE Transactions on Intelligent Transportation Systems, vol. 20, No. 3, Mar. 2019; pp. 1181-1190 (Year: 2019).*
(Continued)

*Primary Examiner* — Alan Chen
(74) *Attorney, Agent, or Firm* — Mannava & Kang, P.C.

(57) ABSTRACT

An Artificial Intelligence (AI) based automatic damage detection and estimation system receives images of a damaged object. The images are converted into monochrome versions if needed and analyzed by an ensemble machine learning (ML) cause prediction model that includes a plurality of sub-models that are each trained to identify a cause of damage to a corresponding portion for the damaged object from a plurality of causes. In addition, an explanation for the selection of the cause from the plurality of causes is also provided. The explanation includes image portions and pixels of images that enabled the cause prediction model to select the cause of damage. An ML parts identification model is also employed to identify and labels parts of the damaged object which are repairable and parts that are damaged and need replacement. The cost estimation for the repair and restoration of the damaged object can also be generated.

17 Claims, 15 Drawing Sheets

(51) Int. Cl.
  *G06V 10/46*   (2022.01)
  *G06V 10/764*  (2022.01)
  *G06V 10/82*   (2022.01)

(56) References Cited

U.S. PATENT DOCUMENTS

| | | |
|---|---|---|
| 2017/0308770 A1* | 10/2017 | Jetley .................... G06V 10/82 |
| 2018/0247416 A1 | 8/2018 | Ruda et al. |
| 2018/0260793 A1 | 9/2018 | Li et al. |
| 2019/0095877 A1 | 3/2019 | Li |
| 2019/0213804 A1 | 7/2019 | Zhang et al. |

OTHER PUBLICATIONS

Thonglek et al., IVAA: Intelligent Vehicle Accident Analysis System, 2019 16th International Joint Conference on Computer Science and Software Engineering (JCSSE), IEEE Xplore published Oct. 2019, pp. 85-90 (Year: 2019).*

Singh et al., Automating Car Insurance Claims Using Deep Learning Techniques, 2019 IEEE Fifth International Conference on Multimedia Big Data (BigMM); pp. 199-207 (Year: 2019).*

Vijakumar et al., A Deep Learning RCNN Approach for Vehicle Recognition in Traffic Surveillance System, International Conference on Communication and Signal Processing, Apr. 4-6, 2019, India; pp. 0157-0160 (Year: 2019).*

Ramprasaath R. Selvaraju, et al., "Visual Explanations from Deep Networks via Gradient-based Localization", Grad-CAM, pp. 1-24.

\* cited by examiner

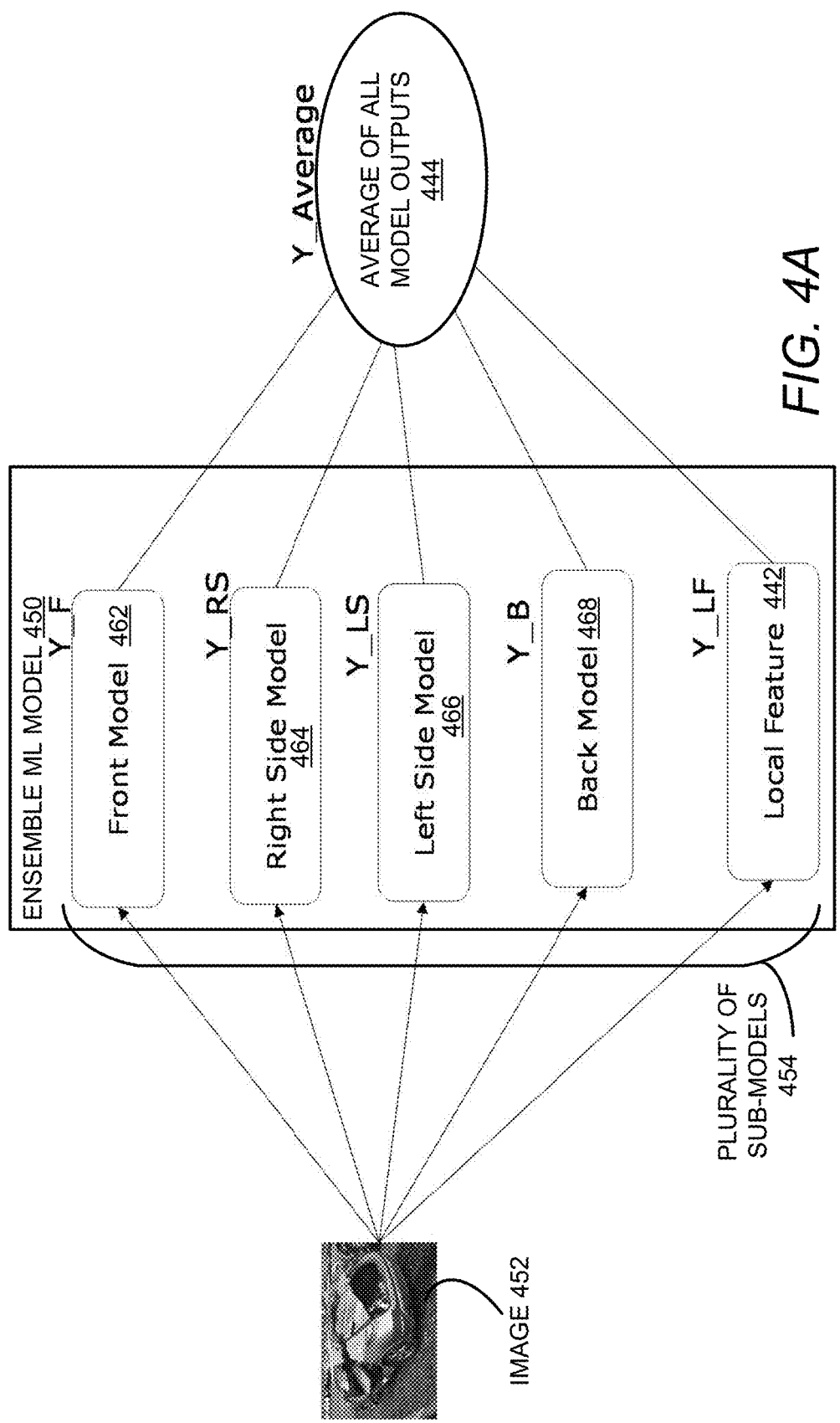

EXPLAINABLE ARTIFICIAL INTELLIGENCE (AI) BASED IMAGE ANALYTIC, AUTOMATIC DAMAGE DETECTION AND ESTIMATION SYSTEM

BACKGROUND

The proliferation of smart devices into daily lives has resulted in vast amounts of data being created in various formats including textual and image data. Collecting and processing such data to gather information for various purposes have become important areas where computing devices are now indispensable. Various text processing tools and image recognition technology and applications are being developed for processing such large quantum of data. Image processing tasks can include object recognition, pattern recognition, image classification, image transformation, etc., which are carried out using image import, analysis and manipulation to provide the output in image/textual formats. Computer algorithms play a vital role in digital image processing tasks. Different algorithms may be employed for executing different tasks, including digital image detection, analysis, reconstruction, restoration, image data compression, image enhancement, etc. Machine vision or computer vision is a field dealing with digital image processing can be employed in different applications such as medical image analysis, industrial robots, cartography, forensics, etc. Newer uses are being discovered and developed each day.

BRIEF DESCRIPTION OF DRAWINGS

Features of the present disclosure are illustrated by way of examples shown in the following figures. In the following figures, like numerals indicate like elements, in which:

FIG. 4A shows an ensemble cause prediction model wherein sub-models are embedded within the larger stacking ensemble model for training and prediction in accordance with the examples disclosed herein.

DETAILED DESCRIPTION

Figure 1:
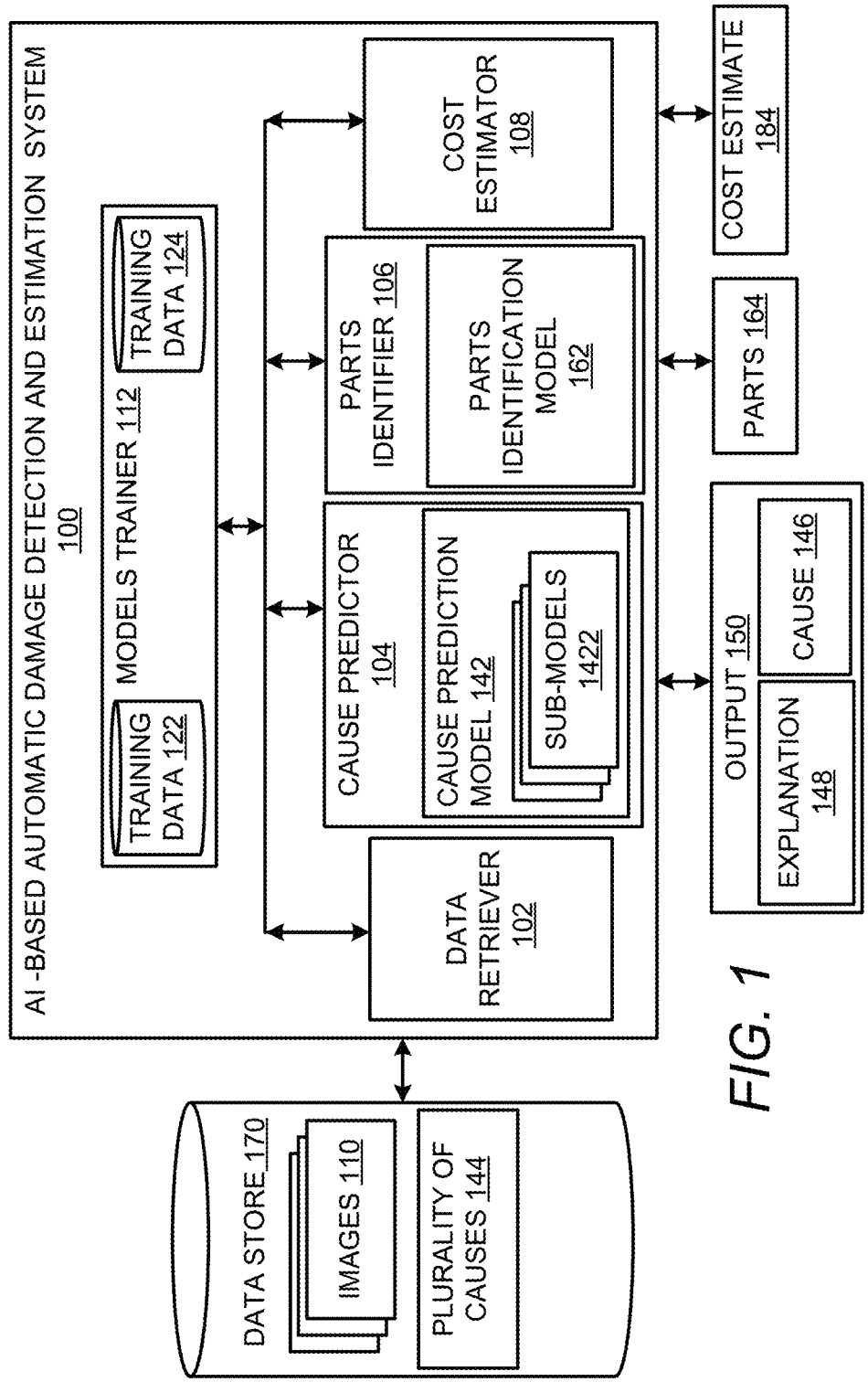
FIG. 1 is a block diagram of an artificial intelligence (AI)-based automatic damage detection and estimation system in accordance with examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

1. Overview

An AI-based automatic damage detection and estimation system that employs ML models to analyze images to not only determine a cause of damage but also to assess the extent of damage and the cost of restoring or repairing the damaged object is disclosed. In an implementation, a damaged object is photographed or captured on video from different angles and on different sides. The images can be uploaded to an estimation system via a mobile app or the images may be captured using the mobile app. In an example, the mobile app can instruct the user recording the images or Videos to capture images in black and white (B/W) or monochrome versions or RGB. In an example, the damage detection and estimation system can convert the received images to B/W versions when images are captured in color.

The B/W and or RGB images are analyzed by a cause prediction model which is an ensemble ML model that is used to identify a cause of damage for the damaged object. The cause can be identified from a plurality of causes associated with a particular object category of the damaged object. For example, if the damaged object is a vehicle, then the plurality of causes may pertain to reasons or situations that damage vehicles such as, collisions, hailstorms, natural perils and the like. Similarly, different object categories for which damages are identified and costs estimated can be associated with a corresponding plurality of causes. In an example, the ensemble cause prediction model enables local feature extraction. The ensemble cause prediction model can include different sub-models representing different cause hypotheses about different angles in which the object appears in the received images. Each sub-model of the ensemble cause prediction model can be trained to output a class (or a selected cause from the plurality of causes) with a probability percentage. In the final step executed by the ensemble cause prediction model, an average (Y_average) of class probabilities from different sub-models is calculated and the class with the maximum probability is provided as the cause of damage.

In an example, each sub-model that make up the ensemble cause prediction model includes a CNN which can be trained on labeled data via supervised training to identify a cause of damage to one part of the damaged object from the plurality of causes. In an example, the labeled data can include B/W or RGB images including the same or similar parts from different damaged and non-damaged objects that belong to the same object category as the damaged object and which are labeled with their corresponding damage causes from the plurality of causes associated with that particular object category.

The final output from the ensemble cause prediction model therefore includes a cause of damage for the damaged object captured in the images. In addition, an explanation for the selection of the cause from the plurality of causes can also be extracted from the individual CNNs that constitute the sub-models of the ensemble cause prediction model. The explanation can include, or reference, specific portions of the images and particular image pixels that enabled the cause prediction models to select or identify the cause from the plurality of causes. In an example, a visualization technique can include gradient-weighted Class Activation Mapping (Grad-CAM) which enables each of the CNNs comprising the sub-models to produce coarse localization maps of important regions of the images or the image portions that lead to the selection of the cause from the plurality of causes. In an example, another visualization technique can include Guided Grad-CAM which enables extracting the particular image pixels that contributed to the identification of the cause from the plurality of causes by the cause prediction models. In another example using filter visualization technique enables visualizations of local and global image pixels that contributed to the identification of the cause from the plurality of causes by the cause prediction models.

The damage detection and estimation system further includes an ML parts identification model that identifies and labels the parts and the states of the various parts of the damaged object from the images. The output from the parts identification model can include one or more images of the damaged object with parts identified and annotated with corresponding states. In an example, the parts identification model can include a Faster Region-based convolution neural network (Faster R-CNN). The Faster R-CNN model is also trained on labeled training data that includes images of other objects belonging to the object category of the damaged object. The images of the other objects are labeled with the various parts in different states. Different objects of the same object category labeled with respective parts and annotated with their corresponding states such as damaged, non-damaged, repair annotations and replace annotations are included in the training data for the parts identification model. When the parts identification model is able to identify the parts the extent of damage is estimated as a percentage of damaged parts versus the non-damaged parts. Based on the parts requiring replacement or repairs, a cost of restoration can be estimated for the damaged object. In an example, third party dealers, original equipment manufacturers (OEMs) or other websites can be accessed in order to retrieve the costs for replacements and repairs. A final output from the damage detection and estimation system in response to the images of the damaged object includes a report with one or more of the cause of damage, an explanation for the selection of the cause, the parts that were non-damaged, repairable or need replacements, the extent of damage and the cost for repairs or restoration of the damaged object.

In an example, the damage detection and estimation system is modularized in that the cause prediction model and the parts identification model can operate independently. Therefore, for situations where only the damage cause prediction is needed, the cause prediction model can be employed. Similarly, in situations where the damage cause is known or not required but a cost of repairs is needed, the parts identification model can be employed.

The damage detection and estimation system as disclosed and described herein provides a technical solution to a technical problem that enables a touchless tool for analyzing digital images of the damaged object and identifying a cause of damage, the exact repairs and replacements required and the cost of restoration. The damage detection and estimation system is configured to analyze damage to an object as a multi-class classification problem with the damage being classified under one of the plurality of causes based on the received images. Currently CNNs are the tools of choice for image analysis tasks. However, unlike basic ML algorithms like decision tress whose output can be explained by following the tree paths leading to the decisions, deep layers of complex ML algorithms, such as CNNs, are often incomprehensible and opaque so that it can be difficult to understand or explain why a certain result has been produced. Increasing data privacy and other regulatory issues can hinder adoption of CNNs in practical computer systems due to their black box approach to decision making.

The disclosed damage detection and estimation system improves on existing image analysis systems initially by providing the ensemble cause prediction model including different sub-models that are trained on different parts of the damaged object to identify the cause of damage. While various ML models can be employed for different tasks, each model has its strengths and weaknesses. Therefore, using a single ML model for predicting a cause of damage can result in lower precision and high error rate due to the high dimensionality of the damaged object. The use of the ensemble cause prediction model is that stacking different sub-models representing different hypotheses of different objects can lead to a better hypothesis which may not be present in separate hypotheses spaces corresponding to the individual models that make up the ensemble. A combination of different sub-models wherein each model is trained on one portion or one part of the object lowers error rate and in addition to achieving good precision.

Another improvement afforded by the damage detection and estimation system is that the CNNs that make up the sub-models of the ensemble cause prediction model are configured to provide visualizations as explanations of why a particular cause was selected from the plurality of causes. Such explanations not only include the portions of the images but also the particular pixels that caused the ML models to select the specific cause. The black box nature of CNN-based models is mitigated by providing a readily understood explanation for the output from the CNNs. Furthermore, the use of monochrome or B/W images for the cause identification and in the training data for training the ML models improves accuracy of the ML models. In addition to the cause of damage and an explanation regarding the cause of damage, the cost for repairs is also automatically recovered from local or external data sources. The damage detection and estimation system therefore improves computer systems by programming a computer system as an automatic one-stop touchless technical solution for damage assessment and restoration. In addition, the use of monochrome or B/W images allows computers to perform accurate analyses using less memory and using fewer processing resources (e.g., computing cycles) than are required if color images are used. Moreover, while the use of B/W images improves accuracy, the images of damaged objects can still include a lot of clutter. Therefore, the use of the ensemble cause prediction model trained with local features when used in consonance with the monochrome or B/W images can lead to improved precision and accuracy.

2. System Architecture

FIG. 1 is a block diagram of an AI-based automatic damage detection and estimation system 100 in accordance with the examples disclosed herein. The damage detection and estimation system 100 includes a data retriever 102, a cause predictor 104, a parts identifier 106 and a cost estimator 108. In addition, the damage detection and estimation system 100 also includes a models trainer 112 that trains different ML models for carrying out different tasks as detailed herein. The data retriever 102 receives images 110 of a damaged object. The damage detection and estimation system 100 may also be connected to a data store 170 for storing inputs such as the images 110 and the outputs that are produced as detailed further herein. The images 110 can include colored or B/W still photographs or videos which are captured by different cameras such as individual camera devices or cameras included in a smartphone, tablet, or other device. Different sides of the damaged object are captured from different angles in the images 110.

The images 110 are accessed by the cause predictor 104 which analyzes the images 110 to determine or predict a cause for the damaged object. The cause for the damage can be identified from a plurality of causes that are predetermined for an object category associated with the damaged object. Different objects of the object category may have different causes for damages. Also, different types of damage to an object may result due to different causes. The cause predictor 104 can be configured to identify a cause 146 from a plurality of causes 144 for the damage captured in the images 110 by analyzing the images 110 using a cause prediction model 142. The cause prediction model 142 is an ensemble ML model that is trained via supervised training on image data labeled with various causes. The model training will be discussed in detail further herein. The output 150 from the cause predictor 104 therefore includes a cause 146 for the damage to the damaged object in the images 110. In an example the cause prediction model 142 can be made up of multiple sub-models 1422 where each sub-model includes a customized CNN.

Additionally, the cause predictor 104 also outputs an explanation 148 for the selection of the cause 146. The cause predictor 104 employs KAI techniques to extract information regarding how and why the cause 146 is selected from the plurality of causes 144. The explanation 148 can be generated by employing tools such as layer and filter visualizations generated by the CNN. In an example, the particular portions of the images 110 and the specific pixels within the images 110 that enabled the sub-models 1422 of the cause prediction model 142 to arrive at the cause 146 can be included in the explanation 148. The output 150 from the cause predictor 104 therefore not only includes textual data referring to the cause 146 of the damage but also includes an explanation in the image format pertaining to the portions and pixels of the images 110 leading the cause prediction model 142 to arrive at the cause 146 and the outputs of the various layers/filters from the sub-models 1422.

The images 110 are also provided to the parts identifier 106 for image segmentation and for identification of the various parts of the damaged object from the images 110. The parts identifier 106 also includes an ML parts identification model 162 for identifying and labelling the various damaged, non-damaged and repairable parts of the damaged object from the images 110. In an example, the parts identification model 162 can include a faster RCNN that is trained via labeled data for the identification of the various parts. The damaged parts are those parts which are identified as both requiring replacement as well as repairable parts which can be fixed without the need for replacements. The parts identifier 106 can also be configured to produce a damage assessment of the damaged object in terms of an overall percentage and in terms of damage percentage for individual parts of the damaged object. The identification of the damaged, non-damaged, repairable and replacement parts 164 enables the damage detection and estimation system 100 to automatically assess the cost of fixing the damaged object. The part 164 also serves to explain visually how images of the repaired parts are similar to each other while being different from examples of other classes, like replacement.

The cost estimator 108 accesses data regarding damaged, non-damaged, repairable and replacement parts in order to generate a cost estimation for repairing the damaged object. In an example, the cost estimator 108 can be connected to a local database which stores the costs associated with repairing or replacing the various parts of the damaged object. In an example, the cost estimator 108 can be connected to a third-party cost estimation provider such as an online tool that provides a more dynamic cost estimate 184 for the repairs. In an example, custom Python scripts can be employed to call third-party data sources such as OEMs, the manufacturers of the object and/or authenticated dealers of the replacement parts to retrieve the total cost of restoring the damaged object.

The final output from the damage detection and estimation system 100 therefore includes the output 150 which details the cause 146 of damage and the explanation 148 for the cause 146, automatically identified damaged parts requiring replacements and repairable parts 164 as well as the cost estimate 184 for repairing the damaged object.

Finally, the models trainer 112 can include or may access different types of training data required to train the various ML models within the damage detection and estimation system 100 including the sub-models 1422 in the cause prediction model 142 and the parts identification model 162. Training data sets 122, 124 with labeled images can be used for supervised training of the ML models. The training data 122 can store sub-sets of images of objects belonging to the same object category such as the damaged object captured in the images 110 that are damaged due to various causes. Each of the sub-sets can be used to train a corresponding one of the sub-models 1422 in identifying a cause of damage for one particular portion of the damaged object. The images for the training data sets 122, 124 can be provided to a software, such as Labelimg which is a graphical image annotation tool and which can label object bounding boxes in images, where the images are manually annotated so that the images map to a specific label name and coordinates into an XML file (e.g., <labelname>fender</labelname>, <xmin>433</xmin>, etc.) The XML file is associated with the respective image where the label and the four coordinate points are appended to form a box or a rectangle at the specific portion of the image as detailed by the coordinates. The XML file and the image are used for training the ML models that learn the parameters and recognize on the new images and maps the trained weights learnt from the training images to detect new images.

For example, if the damaged object in the images 110 is a car damaged due to a hailstorm the damage detection and estimation system 100 is trained to identify the cause of damage on the training data 122 which includes images of different parts of the cars damaged due to various reasons such as hailstorms, natural perils, collisions, etc. The training data 122 can include a subset of images of front portions of different cars damaged due to one of the causes, e.g., a hailstorm. Therefore the subset of images can be used to train a sub-model to identify the front portion of a car damaged due to a hail storm. Another sub-set including images of rear portions of different cars damaged due to collisions can be employed to train a sub-model to identify rear portion of the car when it is damaged due to a collision. For each cause, the training data 122 can include a plurality of sub-sets of images corresponding to different portions of an object damaged due to that cause. Furthermore, it was observed that the accuracy of the cause prediction model 142 improved when B/W images were used for training as opposed to colored images. Hence, B/W images of different parts of the cars which are damaged due to various causes that form the plurality of causes 144 are included in the training data 122 for training the cause prediction model 142. Furthermore, it is observed that both the precision and accuracy in identifying the cause of damage improves when an ensemble model is used as opposed to a single model. In an example, precision can be obtained as:

precision=true positives/(true positives+false positives)      Eq. (1)

Similarly, the training data 124 which is used for training the parts identification model includes images of cars with their external parts explicitly labeled. The training data 124 can include images of cars with the external parts in different conditions with the various parts labeled to reflect the condition of that part. For example, there can be images of cars with bonnets that are not damaged, bonnets that are damaged and need replacements and bonnets that can be repaired. For each labeled part of the object, various images of the part in different conditions need to be included in the training data 124 in order to train the parts identification model 162 to provide an output not only recognizing the part but also identifying a condition of the part.

The models trainer 112 can be configured to apportion part of the training data set for testing in order to test the accuracy of the trained models. Generally 80% of the data set may be used for training the models while 20% may be used for testing the trained models. Various factors were experimented with as detailed herein in order to improve the accuracy of the ML models. In an example, initial hyper-parameter of 100 epochs was used with a batch size of 32 for the training data 122, which yielded a model accuracy of 40% on the test data set. The number of epochs is a hyper-parameter that defines the number of times that the model will work through the entire training data set. Similarly, with 1000 epoch, the parts identification model 162 was only able to detect some parts of the damaged object e.g., a bumper of the car with the model accuracy of around 46%. When the epoch was raised to 20K epoch, the loss came down and the model accuracy rose to 89-98% range. The ML models that are able to produce results with the desired accuracy can be launched within the automatic damage detection and estimation system 100.

The different component parts of the damage detection and estimation system 100 can be designed as separate modules that can be individual operated using micro and lightweight web framework such as Flask®. For example, the damage detection and estimation system 100 may only include the cause predictor 104 which outputs the causes and the reasons for selecting the causes for various damages. In another example, the damage detection and estimation system 100 can be operated as a whole to include the various component parts for predicting the causes and for producing the estimates for fixing the damaged objects as detailed herein.

While the automatic damage detection and estimation system 100 is described above with respect to objects associated with a single object category, it can be appreciated that similar automatic damage detection and estimation systems can be developed for different object categories. For example, different object categories pertaining to machinery, buildings, materials, etc. can be identified. Each object category can have a corresponding plurality of causes for damage to objects of that category for selection. In fact, there can be sub-categories within a given object category with their corresponding plurality of damage causes. When the images are initially received, object identification techniques as detailed herein can be adopted to classify the images into a specific object category and damage causes can be selected from the corresponding plurality of causes using an ensemble cause prediction model (including sub-models) trained for that object category in accordance with the training methodologies disclosed herein. Similarly, various parts of the damaged object and their states can also be identified using a parts identification model trained for the specific object category and cost estimation for restoration/repairs can be retrieved from the corresponding data sources which include the relevant information.

Figure 2:
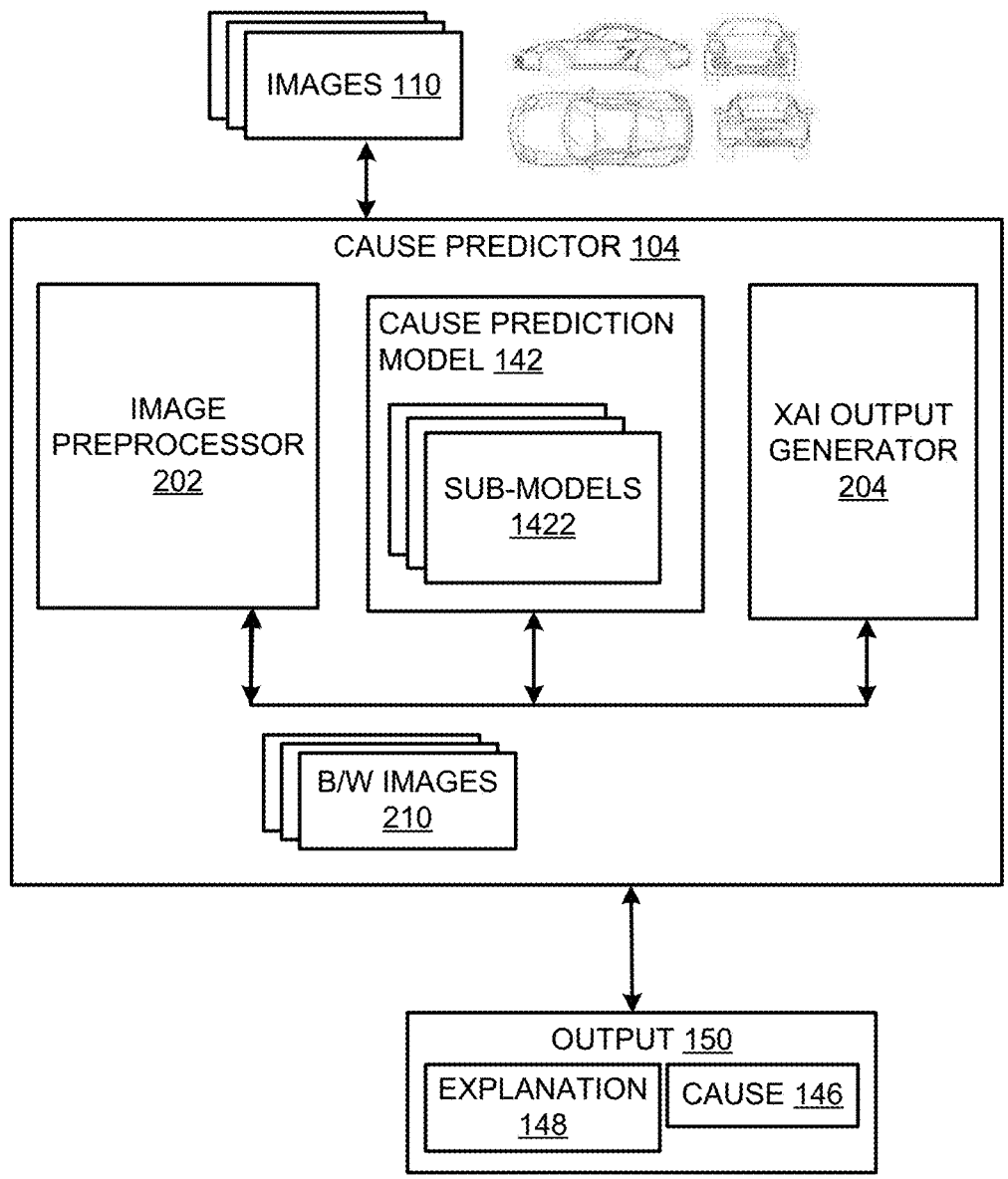
FIG. 2 shows a block diagram of a cause predictor employing a machine learning (ML) model in accordance with examples disclosed herein.

FIG. 2 shows a block diagram of the cause predictor 104 in accordance with some examples. The cause predictor 104 includes an image preprocessor 202, the cause prediction model 142 and an XAI output generator 204. The analysis of the images 110 for identification of a cause from the plurality of causes 144 pertains to a multi-class classification problem wherein the cause prediction model 142 classifies the images 110 into one of the plurality of classes/causes. Examples are discussed herein below referring to damage to vehicles due to various causes. However, it can be appreciated that the ML models and training methodologies discussed herein are applicable to identifying and estimating damages to various objects due to different causes/classes.

The image preprocessor 202 is configured to determine if the images 110 are monochrome, grayscale or B/W images or if the images 110 are colored images based on the RGB values of the pixels. If the images 110 are colored images, the image preprocessor 202 converts the colored images to B/W images 210 since using B/W images increases the accuracy of the model prediction. For example, it is determined that the cause prediction model 142 had an accuracy of about 40% with colored images but the accuracy increased to almost 80% when monochrome, grayscale or B/W images were used. Generally, grayscale images have equal red, green and blue values. Filters or other tools can be applied to the images to convert the RGB values for each pixel in order to obtain the B/W images.

The B/W images 210 are accessed by the cause prediction model 142 for determining the cause 146 for damage from the plurality of causes. Alternately, the cause prediction model 142 can classify the images 110 into one of classes pertaining to the plurality of causes 144. In an example the images 110 can include a damaged vehicle and the plurality of causes 144 which are applicable can include collision, hailstorm or natural peril (such as hurricanes, floods, etc.). The sub-models 1422 that are comprised within the cause prediction model 142 are each trained to identify one portion of the vehicle damaged due to one of the causes. Accordingly, if there are 'm' vehicle portions or parts to be identified (where m is a natural number), the cause prediction model 142 can have m sub-models that cover the entire external surface of the object. It may be noted that three causes are used herein for the plurality of causes 144 for illustration purposes only and that the cause prediction model 142 can be trained to identify a cause from greater or lesser number of causes as applicable. Similarly, other instances of the cause prediction models can be trained on other applicable causes to identify a cause of damage to other damaged objects in accordance with the examples disclosed herein.

The cause prediction model 142 is augmented with an XAI output generator 204. The XAI output generator 204 employs model-specific techniques such as Grad-CAM for producing visual explanations for CNNs included in the sub-models 1422. Grad-CAM takes a feature map of the final convolution layer and then weighs every channel in the feature map based on the gradient of a target class with respect to the channel. Next, global average pooling across two dimensions of the class gradients follow by RELU activation are applied to obtain the visual explanation. One or more images highlighting the important regions in each of the images 110 that contributed to making a prediction regarding the cause 146 are generated by the sub-models 1422 and thus output by the XAI output generator 204. While Grad-CAM visualizations can localize relevant image regions to a reasonable degree for certain applications, they fail to show fine-grained importance like pixel-space gradient visualization methods. Therefore, an additional technique referred to as Guided Grad-CAM can be employed to generate high-resolution visualizations from one or more of the sub-models 1422 that can show the exact pixels that were important or that contributed the most to the decision of the cause prediction model 142 regarding the cause 146. The sub-models 1422 therefore enable extracting local feature visualizations. The same local features are used as part of XAI and are visualized for better interpretability of decision making. Global features describe an image as a whole and can be interpreted as a particular property of the image involving all pixels, while the local features aim to detect key points within the image and describe regions around these key points. Edge detection can provide good explanations regarding the features or edges that were involved in the model decision making. The output 150 from the cause predictor 104 is generated to include the cause 146 of the damage as provided by the cause prediction model 142 and the image portions and image pixels leading the cause prediction model 142 to arrive at the cause 146 as provided by the XAI output generator 204.

Figure 3:
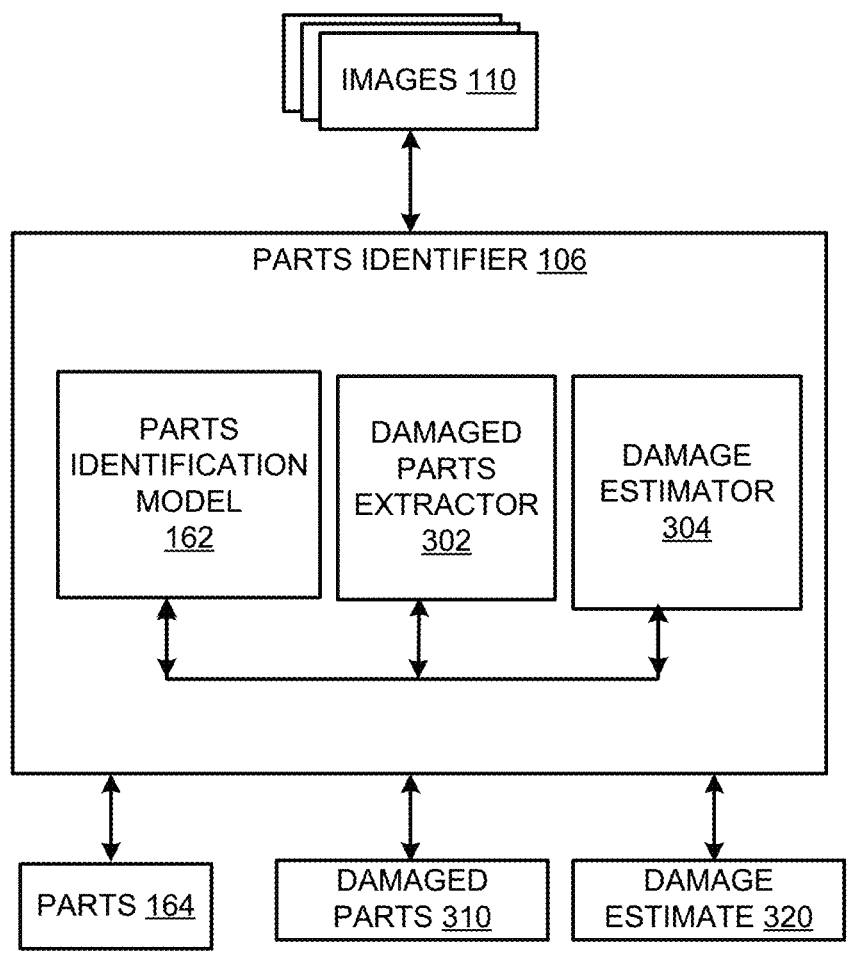
FIG. 3 shows a block diagram of a parts identifier employing an ML model in accordance with examples disclosed herein.

FIG. 3 shows a block diagram of the parts identifier 106 in accordance with the examples disclosed herein. The parts identifier 106 analyzes the images 110 using the parts identification model 162 which is trained via supervised learning to identify the various parts of the damaged object pictured in the images 110. More particularly, the parts identification model 162 is trained to segment and recognize the different non-damaged, damaged and repairable parts of the damaged object in the images 110. In an example, the parts identification model 162 includes a Faster RCNN which is an object detection model. The damaged objects such as vehicles generally tend to be complex with various external parts. Therefore, assigning labels to the external parts with image classification models can be difficult. Object detection models such as the RCNN are more appropriate to identify multiple relevant parts/objects from a single image. Moreover, object detection models provide for localization of the objects as opposed to the image classification models. In an example, Tensor Flow® object detection application programming interfaces (APIs) can be used for the parts identification. The parts identification model 162 therefore outputs the versions of the images 110 with the parts 164 labeled. Furthermore, the parts identification model 162 can also identify portions pf the images 110 that include the damaged portions which are output by a damaged parts extractor 302. In an example, the damaged parts extractor 302 identifies those parts labeled as damaged parts and other parts labeled as repairable parts. A damage estimator 304 access the data regarding the damaged parts 310 in order to determine the extent of damage to the damaged object from the images 110. In an example, image comparison techniques can be used to identify the extent of damage to each damaged part in terms of damage percentage. The damage estimator 304 can employ a ratio of the damaged parts to the total number of parts of the damaged object in order to determine the extent of damage as a percentage. The damage estimate 320 can therefore be generated as an infographic e.g., a pie chart to convey the damage percentage.

FIG. 4A shows an example of an ensemble ML model 450 used as the cause prediction model 142 trained to identify damage to a car in accordance with the disclosed examples. The ensemble ML model 450 includes a plurality of sub-models 454. One of the images 452 is analyzed by each of the plurality of sub-models 454 that is trained to classify one of the portions of the car into one of the plurality of causes 144. If the portion of the car is not damaged, then the likelihood may be insignificant for all the plurality of causes. Accordingly, the front model 462 outputs a likelihood regarding a cause of damage Y_F to the front portion of the car selected from the plurality of causes associated with the car category. Similarly, the right side model 464 outputs a likelihood regarding the cause of damage Y_RS to the right side of the car, the left side model 466 outputs a likelihood regarding the cause of damage to the left side of the car while the back model 468 outputs a likelihood regarding the cause of damage to the back portion of the car. The local feature model 442 enables local feature extraction. The final output 444 regarding the most likely cause of damage is computed as an average of all the model outputs. Model averaging is an ensemble method where the plurality of sub-models 454 can contribute equally to a combined prediction. In an example, the contributions of the sub-models can be weighed by the corresponding expected performances of the sub-models which can be extended via 'stacking' wherein another ML model learns a best way to combine the contributions from the different sub-models to produce output of highest accuracy.

Figure 4B:
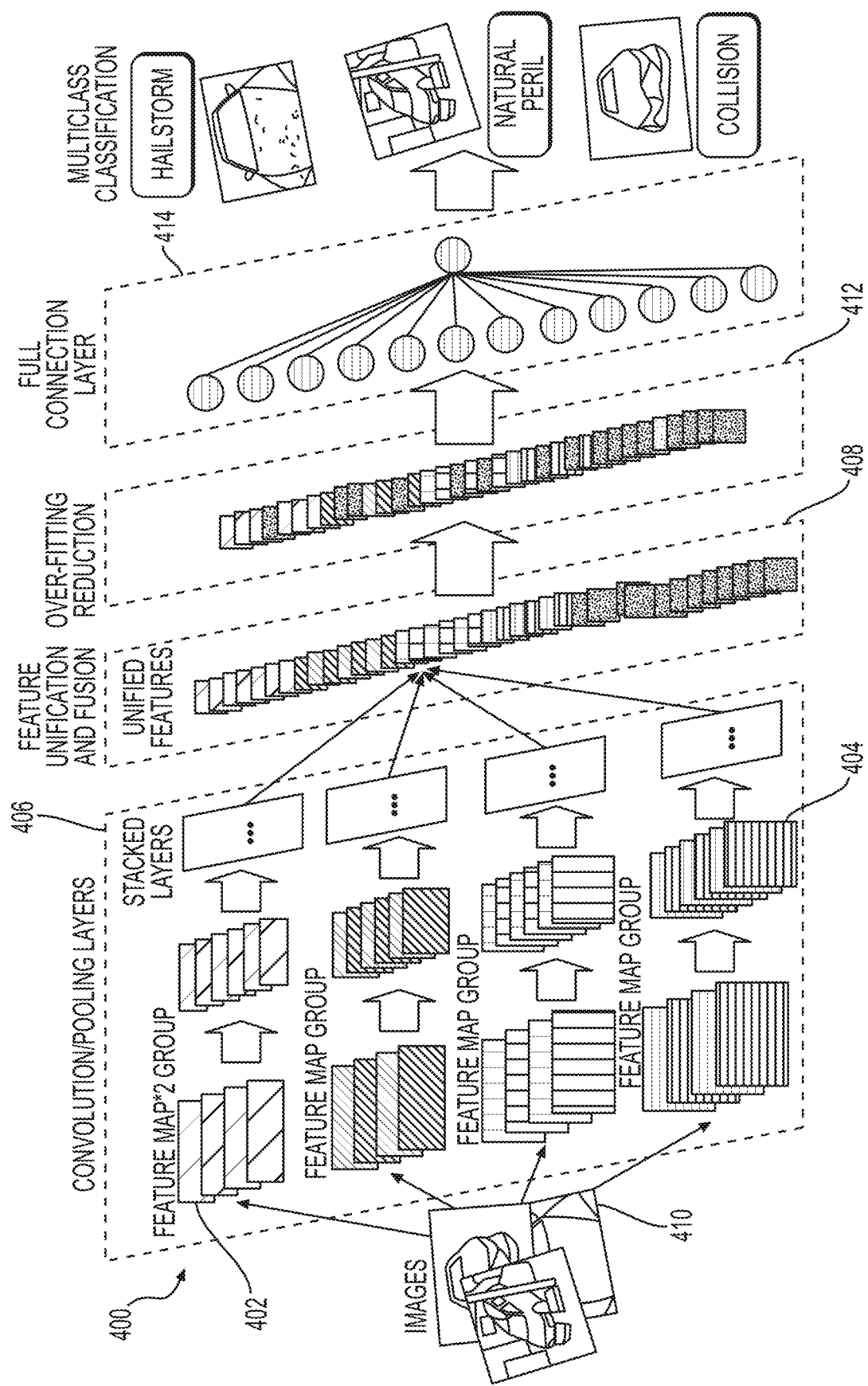
FIG. 4B shows a block diagram of a Convolutional Neural Network (CNN) used for the sub-models in accordance with examples disclosed herein.

FIG. 4B shows a block diagram that shows a high-level architecture of a CNN 400 employed for a sub-model in the ensemble of the cause prediction model 142 in accordance with the examples disclosed herein. It can be appreciated that the details of the CNN are discussed herein for illustrative purposes only and that other ML models can also be employed in accordance with the examples disclosed herein. CNNs are neural networks made up of neurons with learnable weights and biases wherein the architecture is designed to handle image inputs. CNNs Convolution layer 402 is the first layer that extracts features from the input images 410 (similar to the images 110) and preserves the relationship between pixels by learning image features using small squares of input data. Convolution is a mathematical operation (e.g., a dot product) that takes two inputs such as the image matrix and a filter or a kernel. The convolution layer 402 can comprise a set of independent filters wherein each filter is independently convolved with each of the input images 410 to produce the corresponding feature maps 404. A dot product of the input provided to each neuron with the corresponding filter is therefore obtained followed by a non-linearity. In an example, the input images may have sizes 200×200×1 wherein 1 is the number of channels since the input images are monochrome or B/W images. In the CNN 400, thirty-two filters, each of 3×3 size may be used with stride 3 throughout the CNN 400. In an example, a CNN having 3 convolution layers was unable to produce output with the required accuracy and was replaced with the CNN 400 having 6 convolution layers thereby improving the model accuracy. Conv1D which did not yield the desired accuracy was replaced with Conv2D for improving the model in terms of model design and prediction. The number of layers that provide the desired accuracy for a model can depend on the model itself and the dataset that the model is being trained on. In some examples, greater number of layers need not necessarily increase the accuracy.

In some instances when the images are too large, the number of trainable parameters need to be reduced. It is then desired to periodically introduce pooling layers between subsequent convolution layers. Pooling enables reducing the spatial size of an image. Pooling is applied independently on each depth dimension and therefore the depth of the image remains unchanged. Furthermore, pooling layers 406 provide for down sampling feature maps 404 to address sensitivity of the feature maps to locations of the features in the input images. Pooling layers 406 enable down sampling by summarizing the presence of features in patches of the feature maps 406. A form of pooling layer generally applied is the max pooling. In an example such as the CNN 400, a 2×2 maxPooling for 3 layers may be applied. The feature maps or activation maps thus obtained are unified via feature unification and fusion 408 wherein the 2-dimensional feature maps/activation maps are stacked along the depth dimension. The CNN 400 can further include a Rectified Linear Unit (RELU) layer for a non-linear operation. The non-linearity is introduced which allows backpropagation of errors to have multiple layers of neurons being activated by the RELU function in the CNN 400 as real-world data requires the CNN 400 to learn non-negative linear values.

Overfitting happens when the CNN 400 is too customized to a given training data set that it fails with unseen data. Many methods such as adding more data, augmenting existing data or using more generalized architectures, adding regularization, etc. can be employed to mitigate overfitting. A popular regularization option includes dropout which can delete a random sample of activations (i.e., zero the output of those neurons) in training. In an example, the CNN 400 can include 4 dropout layers at 412 that remove a predetermined percentage of neurons in order to better generalize the CNN 400 so that it works well with unseen data sets.

The feature map matrix after the pooling layers 406 can be flattened as vector (x1, x2, x3 . . . ). With the fully connected layers 414, the features are combined together to create a model. Convolution layers generate 3D activation maps while the output includes a determination regarding whether or not an image belongs to a particular class (e.g., one of the plurality of causes 144). The output layer has a loss function like categorical cross-entropy, to compute the error in prediction. Once the forward pass is complete the backpropagation begins to update the weight and biases for error and loss reduction. In an example, the loss function can include activation Softmax and cross-entropy loss. In an example, the loss function can be given as:

$$f(s)i = \frac{e^{s_i}}{\sum_j e^{s_j}} \quad CE = -\sum_i^C t_i \log(f(s)_i) \quad \text{Eq. (2)}$$

Eq. (2) includes a Softmax activation and a Cross-Entropy (CE) loss. The CNN is trained to output a probability over the C classes for each image. It is used for multi-class classification wherein the Target vector t is computed as a gradient of CE loss with respect to each of the CNN class score (s) where $s_i$ is the score of any positive class. In Eq. (1), $t_i$ and $s_i$ are the ground truth and the CNN scores for each class i in C. An activation function Softmax is applied to the scores before the CE loss is computed wherein $f(s_i)$ refers to the activations.

Figure 4C:
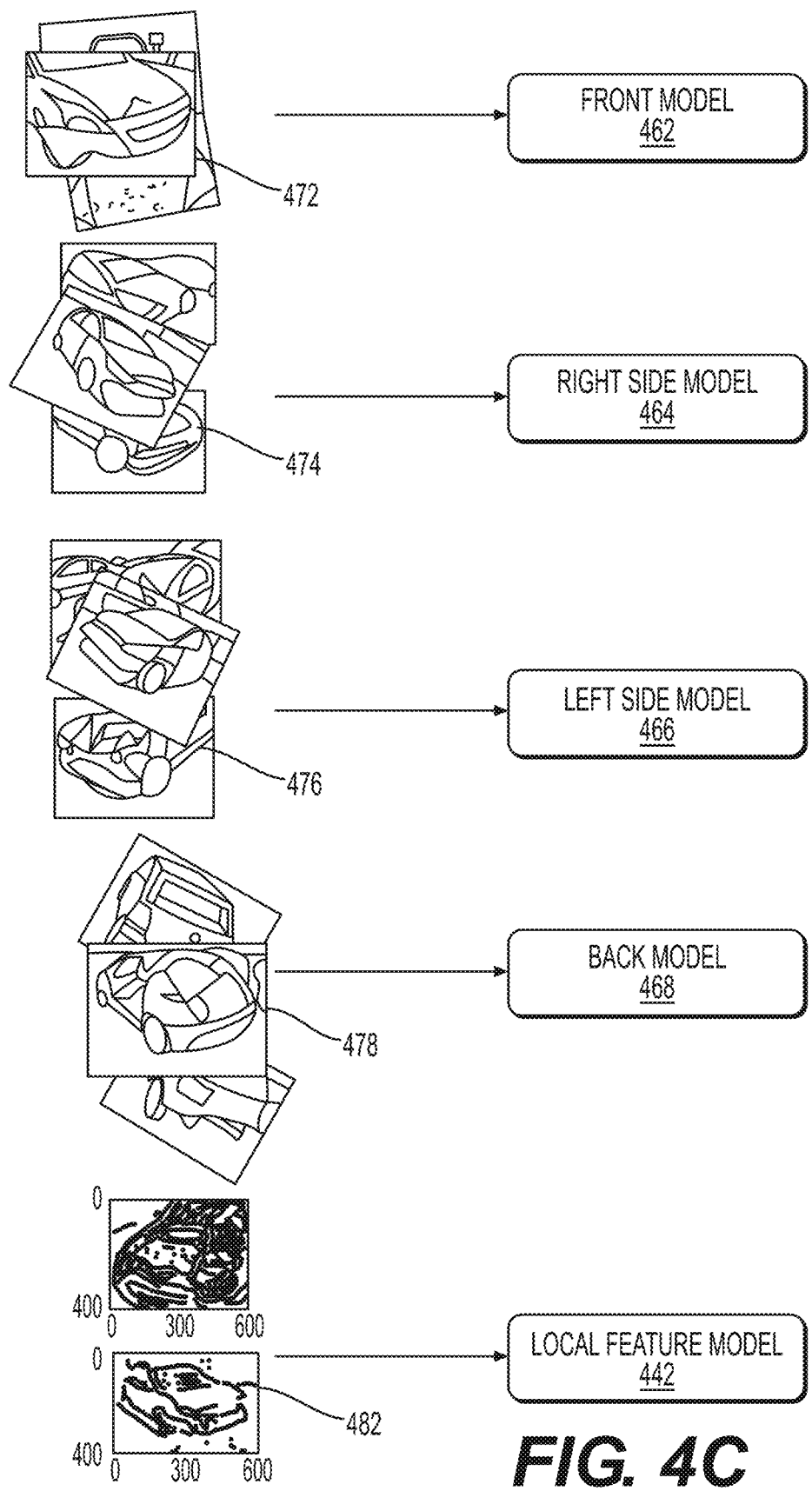
FIG. 4C shows data used for training the sub-models in accordance with examples disclosed herein.
Figure 5:
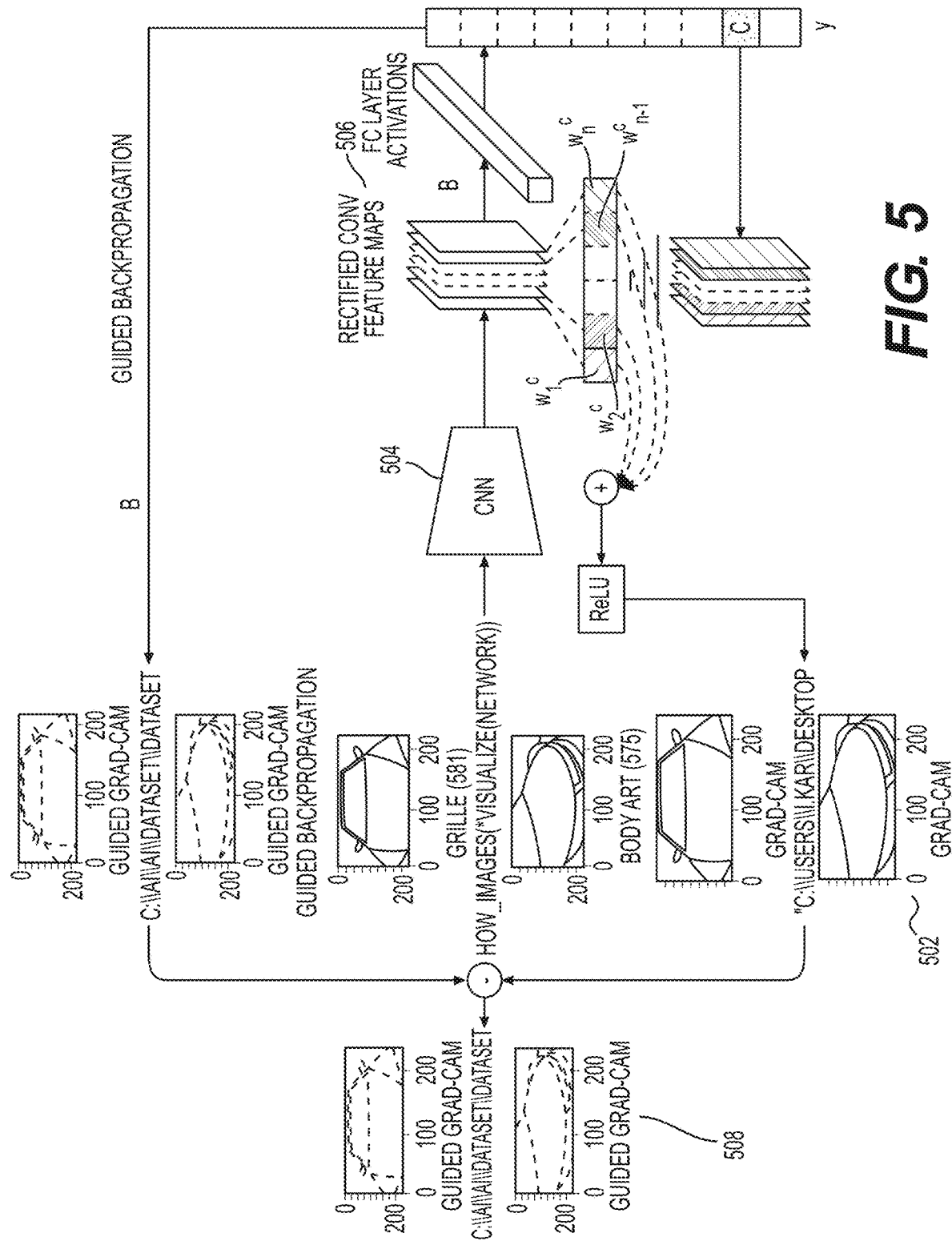
FIG. 5 shows a block diagram illustrating explainable AI (XAI) aspects of the cause prediction in accordance with examples disclosed herein.

FIG. 4C shows a block diagram 470 detailing the training of each of the plurality of sub-models 454 in accordance with the examples disclosed herein. The images 472 of front sides of different cars damaged due to various reasons are provided to the Front model 462 along with the corresponding cause of damage information to the Front model 462. For example, the images 472 include bonnets of cars damaged due to collision and hailstorm. Similarly, images 474 of right sides of different cars damaged due to various reasons are provided along with the corresponding cause of damage information to the Right side model 464. Images 476 of left sides of different cars damaged due to various reasons are provided along with the corresponding cause of damage information to the Left side model 466. Images 478 of rear portions of different cars damaged due to various reasons are provided along with the corresponding cause of damage information to the Back model 468 while images 482 of local features are provided to train the local feature model 442. One example of training a ML model with local features employs OpenCV edge detector. It enables the local feature model 442 to recognize the damaged object despite significant clutter and obstruction, FIG. 5 shows a block diagram illustrating the XAI aspects of the cause prediction employing the Grad-CAM and Guided Grad CAM in accordance with the examples disclosed herein. The inputs to the XAI output generator 204 can include one or more of the images 110 and the plurality of causes 144. The images 110 are forward propagated along path 'C' through the CNN 504 and task-specific computations to obtain a score for one of the plurality of causes. The gradients are set to zero for all the causes except for the desired cause which is set to 1. The non-zero signal is then back-propagated along path 'B' to the rectified convolutions feature maps of interest 506 which are combined to compute the coarse Grad-CAM localization that include the images 502 with the image portions employed by the cause prediction model 142 for arriving at the cause 146. The images 502 are pointwise multiplied with the guided back propagating signal to get Guided Grad-CAM visualizations 508 that have high-resolution and are cause-specific.

An example visualization technique includes showing the activations of the network during the forward pass along path 'C'. For ReLU networks, the activations initially tend to be relatively blobby and dense, but as the training progresses the activations usually become more sparse and localized. A drawback with this visualization is that some activation maps may be all zero for many different inputs, which can indicate "dead" filters, and can be a symptom of high learning rates. Dead filters can be avoided by using Cony/fully connected (FC) filters. Conv/FC filters are generally interpretable on the first convolutional layer which directly analyzes the raw pixel data from the input images. However, visualizations for filters deeper in the CNN can also be obtained. The second strategy is to visualize the weights. The weights are usually most interpretable on the first convolutional layer which processes the raw pixel data, but it is possible to also show the filter weights deeper in the network. The weights are useful to visualize because well-trained networks usually display smooth filters without any noisy patterns. Noisy patterns can be an indicator of a network that hasn't been trained for long enough, or possibly a very low regularization strength that may have led to overfitting.

To obtain the class-discriminative localization map, Grad-CAM computes the gradient of $y^c$ (score for class c) with respect to k feature maps $A^k$ for of each convolutional layer corresponding to different ij. These gradients flowing back are global-average-pooled to obtain the importance weights $\alpha^c_k$:

$$\alpha^c_k = \overbrace{\frac{1}{Z}\sum_i\sum_j}^{\text{global average pooling}} \underbrace{\frac{\partial y^c}{\partial A^k_{ij}}}_{\text{gradients via backprop}} \quad \text{Eq. (3)}$$

Similar to CAM, Grad-CAM heat-map is a weighted combination of feature maps, but followed by a ReLU:

$$L^c_{Grad-CAM} = ReLU\underbrace{\left(\sum_k \alpha^c_k A^k\right)}_{\text{linear combination}} \quad \text{Eq. (4)}$$

It may be appreciated that Grad-CAM has been discussed herein as one example of XAI and that other visualization techniques such as but not limited to, OpenCV saliency MAP, Keras Class Activation maps and OpenCV heat maps may also be employed to yield similar results.

Figure 6:
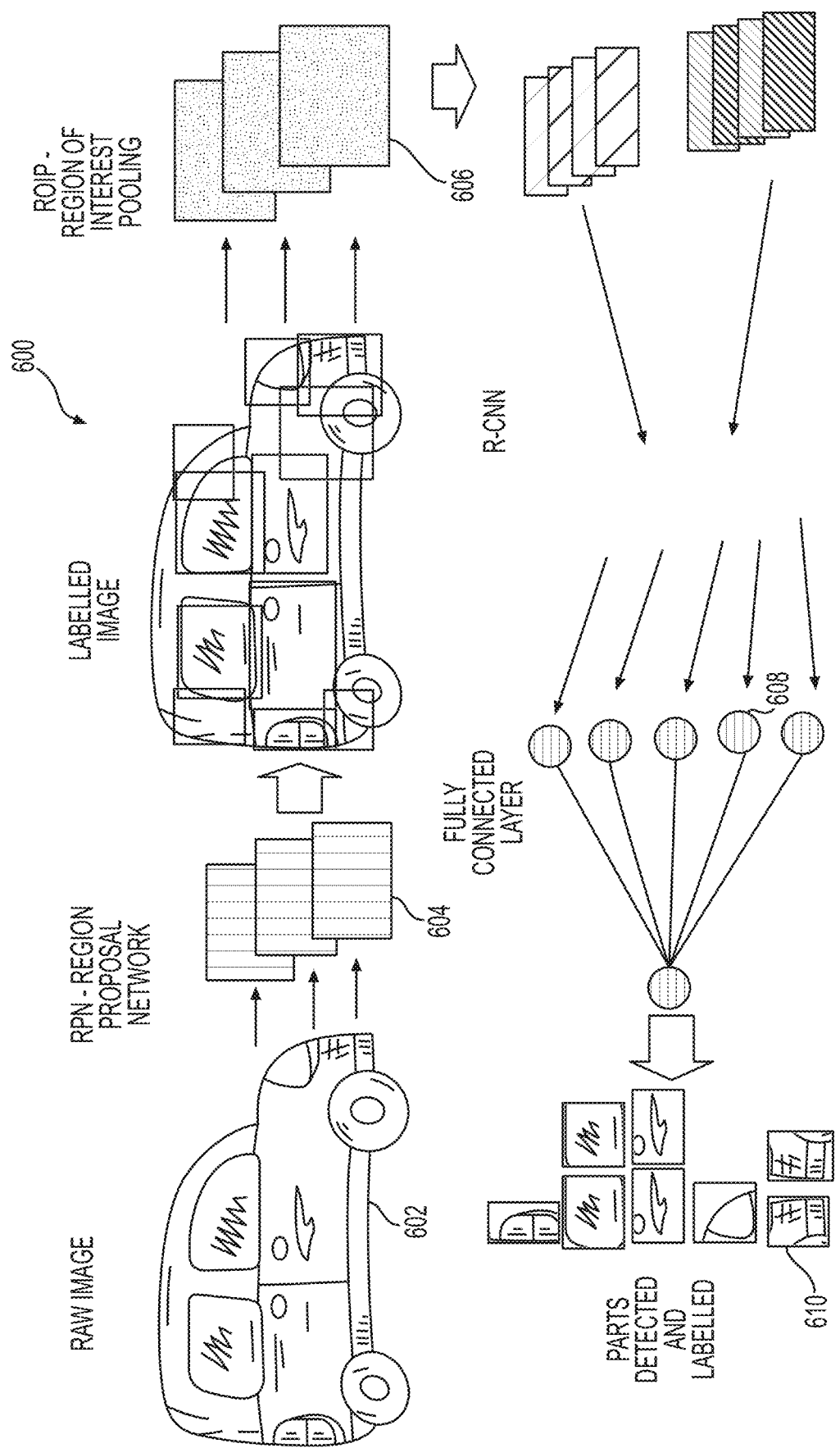
FIG. 6 shows a block diagram that details detecting and labelling the parts of an object in accordance with examples disclosed herein.

FIG. 6 shows a block diagram 600 that details detecting and labeling the parts of an object e.g., the damaged object by the parts identifier 106 from the images 110 in accordance with the examples disclosed herein. The parts identifier 106 employs a faster RCNN that is trained via labeled data for the identification of the various parts including damaged parts, repairable parts and non-damaged parts which are intact and need no repairs or replacements. Images of some example damaged objects such as vehicles or other machinery can be complex with multiple parts. Therefore, assigning labels with image classification models can be difficult and may lead to inaccurate results. Instead, object detection models such as the faster RCNN are employed to identify multiple relevant objects (i.e., parts) from one or more of the images 110. Another advantage of using object detection models versus image classification models in this instance is that the object detection models provide for localization of the objects which aids in isolating parts of the damaged object. In an example, Faster RCNN-Inception-V2-COCO can be used in the parts identifier 106.

A raw image 602 which can include one of the images 110 which may include a B/W image or a colored RGB image prior to B/W conversion is analyzed to generate proposals for the regions that contain different objects i.e., the parts of the damaged object in the raw image 602. To generate the region proposal networks (RPNs) 604 for the different object parts, a small network is slid over a convolutional feature map from the last convolutional layer. Each of the RPNs can include classifiers and regressors. The classifier of a RPN can determine the probability of a proposal having a target object (i.e., a part of the damaged object) and regressors regress the coordinates of the proposals. The output from the RPNs which include proposals or image regions that are likely to contain target object may be of different shapes. Next, the region of interest pooling (ROIP) 606 is employed to reshape the regions that are output from the RPNs into fixed sizes such as squares. The proposals thus reshaped or the reshaped regions are finally fed to the fully connected layer 608 to obtain a final output with the various labeled parts 610. The output at 610 can include the raw image 602 with the various labeled parts wherein the annotations can be saved in an attached extensible markup (.xml) file. From the ROI feature vectors, a Softmax layer can be used to predict the class of the proposal or the proposed region and to also offset the values of the bounding box. In an example, the class of the proposed region may not only include the object part but also a state of the object part i.e., whether the part is damaged, repairable, replaceable and non-damaged. Once the fast RCNN model can identify the parts of the damaged object and the corresponding states, a damage percentage indicative of the extent of damage to the damaged object can be obtained as a ratio of the total damaged and defective body parts divided by the total body parts of the object. The cost estimator 108 provides a cost estimate for each body part that needs a replacement or a repair.

3. Flow Charts

Figure 7:
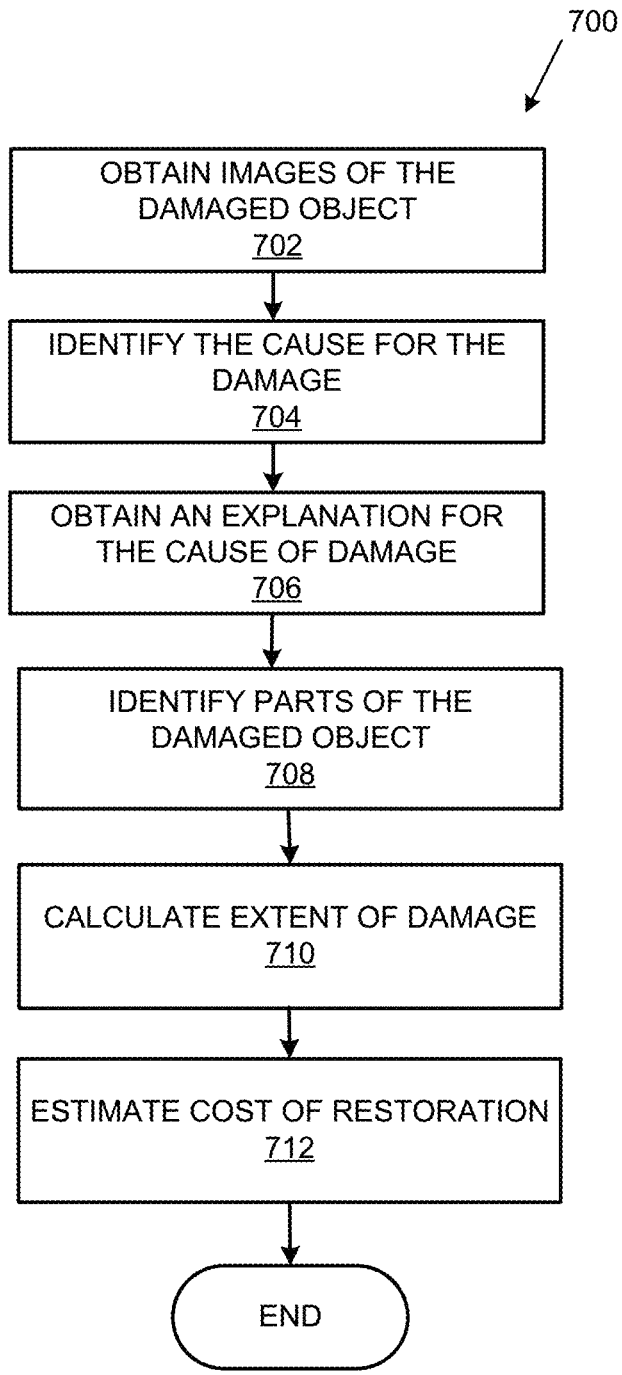
FIG. 7 shows a flowchart that details a touchless method of automatically detecting damage to an object and estimating cost of restoring the damaged object in accordance with examples disclosed herein.

FIG. 7 shows a flowchart 700 that details a touchless method of automatically detecting damage to an object and estimating the cost of restoring the damaged object in accordance with the examples disclosed herein. The method outlined in the flowchart 700 is touchless as a computing device implementing the automatic damage detection and estimation system 100 can receive raw images such as the images 110 and output the likely cause of damage, the extent of damage and the cost estimation for the repair of the object. The computing device implementing the damage detection and estimation system 100 as described herein can include mobile devices such as a tablet device, a smartphone, etc. Hence, the damage detection and estimation system 100 can be implemented on edge devices, for example, as an "app", In fact, as mentioned above, the damage detection and estimation system 100 can be modularized using, for example, Flask® services so that certain portions of the damage detection and estimation system 100 may be separately installed without requiring other portions. For example, the cause predictor 104 can be used without the parts identifier 106 or vice versa. At 702, the images 110 of the damaged object are received. For example, a user who may be at the location of the damaged object can capture the images 110 of the damaged object using a mobile device or other camera devices and transmit them to the damage detection and estimation system 100 via a communication network such as the internet. At 704, the cause 146 of the damage is determined from the plurality of causes 144 using the cause prediction model 142. At 706, an explanation for the selection of the cause 146 from the plurality of causes 144. The explanation is generated using techniques such as Grad-CAM and guided Grad-CAM and includes portions and pixels from the images 110 that enabled the cause prediction model 142 in selecting the cause 146 from the plurality of causes 144.

At 708, the various parts of the damaged object are identified from the images 110 using the parts identification model 162. Furthermore, the parts identification model 162 can be configured to identify damaged parts that need replacement, partially damaged parts that can be repaired and parts of the damaged object that are intact. More particularly, the parts identification model 162 can output images of the damaged/partially damaged parts of the damaged object. At 710, the extent of damage is calculated as described herein and output as a percentage. At 712, the cost estimation for the restoration of the damaged object is obtained from one or more of the object manufacturers and/or parts dealers. The cause of damage, the output from the parts identification model 162 and the cost estimation are output by the damage detection and estimation system 100.

Figure 8:
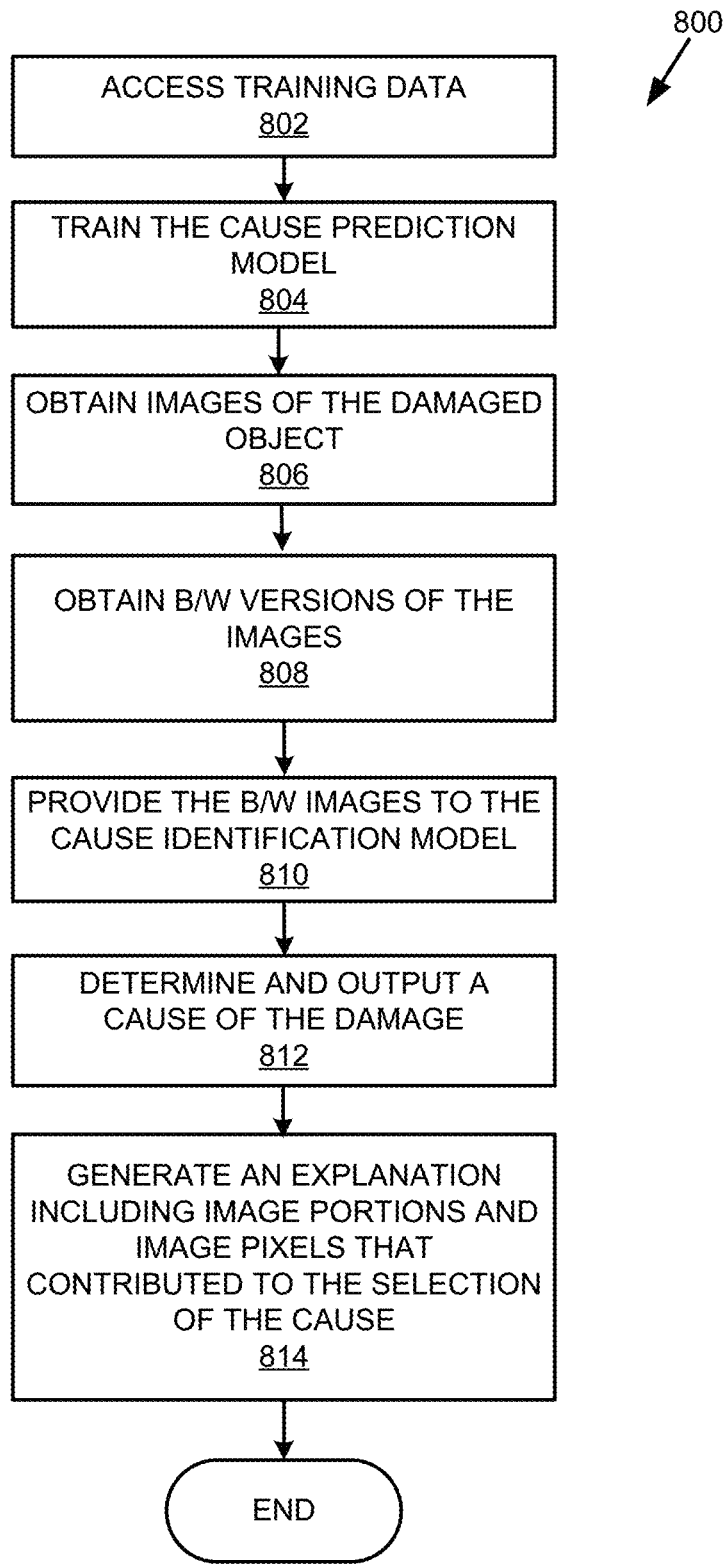
FIG. 8 shows a flowchart for determining a cause of damage to the damaged object from received images in accordance with examples disclosed herein.

FIG. 8 shows a flowchart 800 for determining a cause of the damage to the damaged object from the images 110 in accordance with an example. At 802, the training data 122 for training the cause prediction model 142 for a particular object category is accessed. The training data 122 can include labeled images of various portions of damaged objects belonging to a particular object category that the cause prediction model 142 is being trained on for automatic cause determination. The training data 122 can include monochrome versions or B/W images of damaged objects labeled with the corresponding causes of damage from the plurality of causes 144. By way of example, in an implementation it is observed that the CNNs used for sub-models within the cause prediction model 142 were producing a low accuracy of 40% with RGB images. However, when B/W images are used, the model accuracy improved to almost 80%. It was also observed that precision of the CNN model was 60% with a single CNN model. However, when, ensemble model was used with Local features the precision was improved to 85%. A CNN was selected as the cause prediction model 142 since the cause of the damage is inferred based on features selected from the entirety of each of the images 110. The CNNs included in the cause prediction model 142 are trained on the labeled training data at 804 via supervised learning. In an example, the CNN models can be trained on Amazon Web Services (AWS) with CPU based process for 1000 epoch which can significantly increase the model accuracy and generalizes the CNNs better in order to enable the CNNs to work with unseen data. Fewer epochs can lead to local maxima on the training dataset. Initial hyper-parameters of 100 epochs where optimizers.adma Ir=0.01, epsilon=None, decay=1 e-6 with a batch size of 32 can yield an accuracy of 40% on a test dataset. While different activation functions such as tan, sigmoid, etc., can be used, RELU Gridsearch computer vision (CV) was employed for the cause prediction model 142 and the hyper-parameters suggested by Gridsearch were chosen which resulted in a model accuracy of 80% for the CNN used in the cause predictor 104.

At 806, the images 110 (B/W or colored images) of the damaged object are obtained. At 808, monochrome versions or B/W versions of the images 110 are obtained using the image preprocessor 202 in case the images 110 are colored images. In an example, where the damage detection and estimation system 100 is implemented as an 'app' in an edge device such as a smartphone, the user taking the pictures of the damaged object can be instructed to capture the images/video in B/W so that the received images can be fed directly to the cause prediction model 142. The B/W or monochrome images are provided to the cause prediction model 142 at 810. The cause prediction model 142 determines and outputs a cause of damage for the damaged object from one of the plurality of causes 144 at 812. As mentioned above, each of the sub-models 1422 outputs a likelihood or a probability percentage regarding the cause of damage to the corresponding portion of the damaged object and the final output from the cause prediction model 142 is obtained as an average of the outputs from the sub-models 1422.

At 814, an explanation of the selection of the cause 146 is generated via the various layer visualizations. The feature maps that result from applying filters to input images and feature maps that are output by prior layers in a CNN can provide insights into the internal representation that the model has of a specific input at a given point in the model. While gradient visualizations may suffice in certain situations, the filter visualizations of each of the layers in the CNN can provide an explanation of a step-by-step process of how the image features were extracted by the CNN. The layer visualizations are obtained using Keras. The layer visualizations can include at least one visualization of the final layer which helped the cause prediction model 142 take a decision between one of the plurality of causes 144. In addition, the pixels that contributed to the decision are also obtained at 810 using the Guided Grad-CAM that shows the pixels that contributed the most to the selection of the cause 146 from the plurality of causes 144. Saliency maps including monochrome images can be output as the explanation for the selection of the cause 146. The portions of the images and image pixels that contributed the most to the selection of the cause 146 may be better seen in monochrome images as opposed to colored images. One advantage of using local features is that they may be used to recognize the object despite significant clutter and obstruction. One example of training the sub-models with Local features includes use of OpenCV edge detector.

Figure 9:
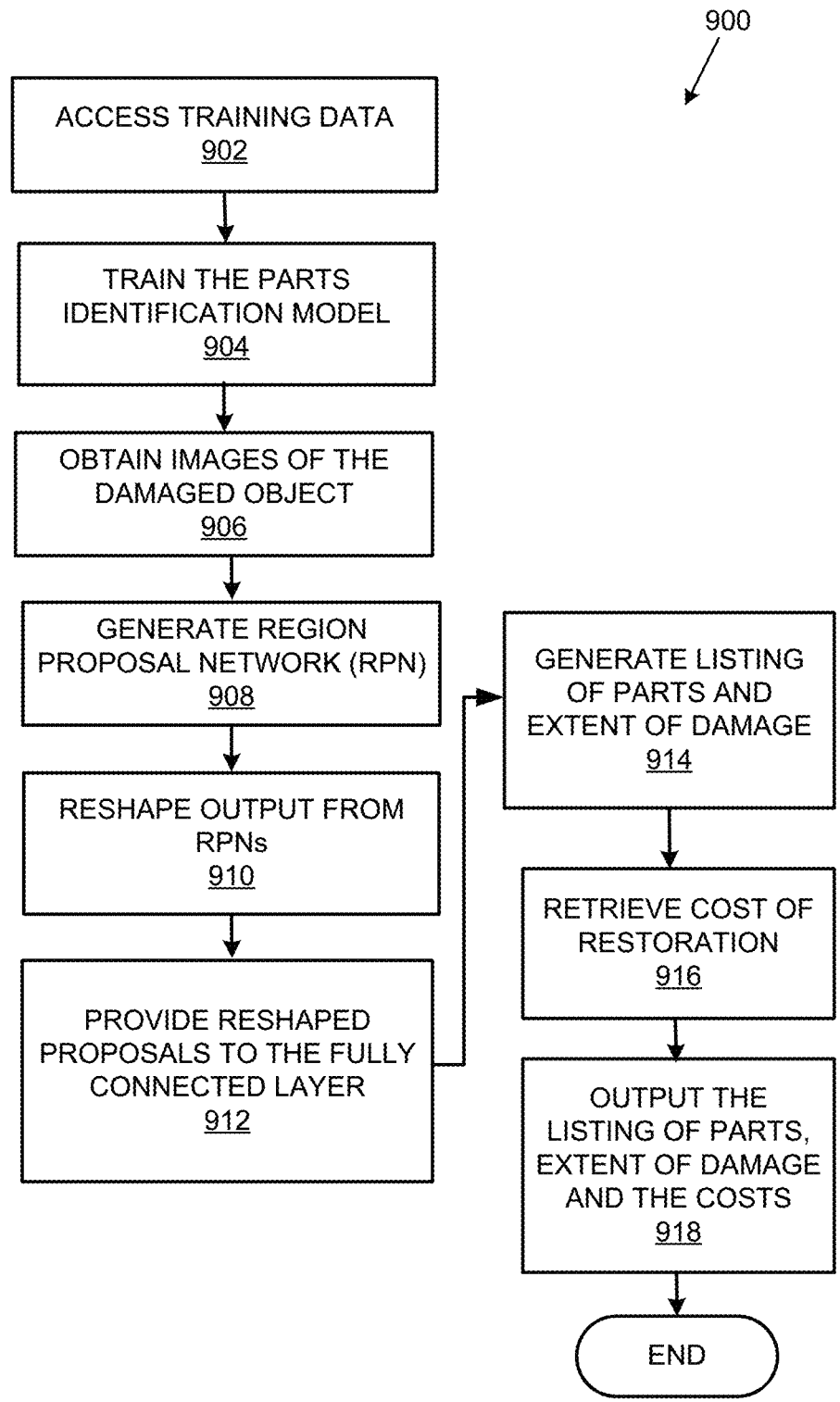
FIG. 9 shows a flowchart that details a method of identifying the various parts of the damaged object and estimating a cost of restoration in accordance with examples disclosed herein.

FIG. 9 shows a flowchart 900 that details a method of identifying the various parts of the damaged object and estimating the cost of restoration in accordance with the examples disclosed herein. The method begins at 902 wherein training data 124 for training the parts identification model 162 for a particular object category is accessed. The training data 124 can include images of various damaged objects belonging to a particular object category with the parts labeled that the parts identification model 162 is being trained on for automatic parts identification. Not only are the parts in the images of the training data 124 labeled but the part labels include further qualifiers that describe whether the part is intact and needs no work, whether the part is repairable and whether the part is damaged—indicating that the part needs replacement. Referring to the example of a damaged car, a scratch on the body may be repairable while a shattered windshield requires replacement. The object images can be processed by a software tool such as 'labelimg' where the images are annotated so that they map to specific label names and co-ordinates in an XML file.

The parts identification model 162 is trained on the labeled training data at 904 via supervised learning. In an example, the parts identification model 162 can include object identification ML models such as a faster RCNN on Windows® Deep Learning using Amazon® Machine Images (AMI). Annotating the images with the qualifiers describing the state of a given part enables the faster RCNN to identify the state of the parts in unseen data. When trained on lower epochs, the faster RCNN can fail to detect all the parts. It was determined that training the faster RCNN model on higher epochs e.g., 20,000 epochs enabled the identification of object parts such as a car's external body parts with model accuracies of about 89%-95%. The training images with the attached xml files are fed to the faster CNN during the training.

At 906, the images 110 of the damaged object are obtained. The region proposal networks are generated at 908 for identifying the various parts and the states of the various parts of the damaged object pictured in the images 110. At 910, the region of interest pooling (ROIP) 606 is employed to reshape the output from the RPNs into fixed sizes such as squares. The reshaped proposals or regions are provided to the fully connected layer of the faster R-CNN at 912 which outputs the detected parts with the labels. At 914, a listing of the parts that are damaged and need replacement and parts which are repairable can be generated along with the extent of damage. In an example, the extent of damage can be estimated in terms of the damage percentage and an infographic such as a pie chart showing the percentage may be generated. The costs of the repairs and replacements can be retrieved 916 using, for example, Python scripts from local or external databases including original manufacturers, replacement part dealers or service providers, etc. The listing of damaged parts along with the extent of damage and the costs are output at 918.

4. User Interfaces

Figure 10:
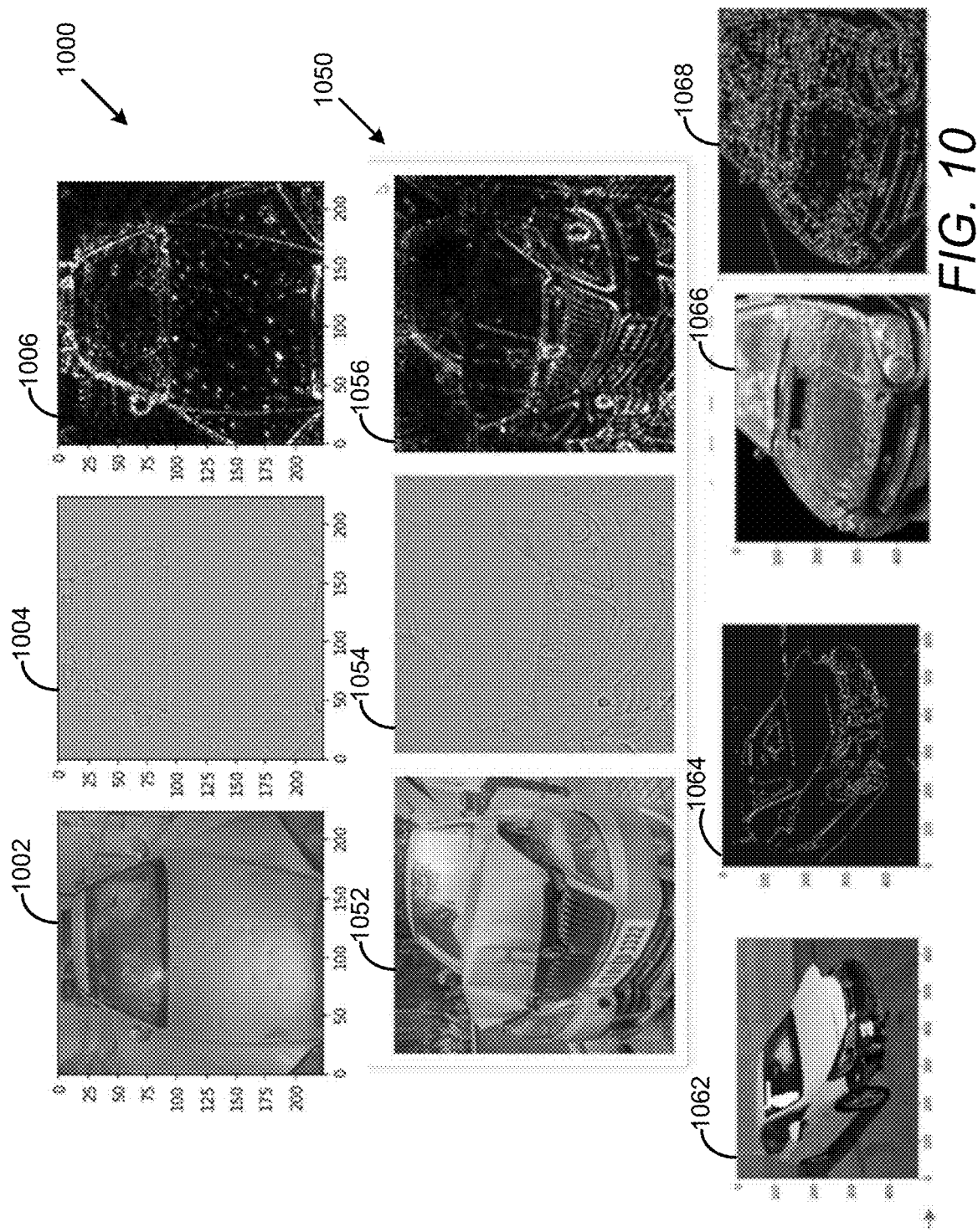
FIG. 10 shows two images generated by an XAI output generator in accordance with examples disclosed herein.

FIG. 10 shows images generated by the XAI output generator 204 in accordance with the examples disclosed herein. The set of images 1000 pertains to images of a car damaged due to hailstorm. An original image 1002 is one example image received within a set of images of the damaged object. The images in the set are analyzed and the important regions in the image 1002 that contributed to making a prediction that the damage was caused by a hailstorm are highlighted and output by the XAI output generator 204 using techniques such as Grad-CAM. The image 1004 is an example image generated via layer visualization. In addition, a saliency map 1006 is generated using Guided Grad-CAM which produces high-resolution visualizations that can show the exact pixels that were important or that contributed the most to the decision of the cause prediction model 142 regarding the cause 146. The output 150 from the cause predictor 104 not only includes the cause 146 of the damage (which is hailstorm in this instance) and the portions and pixels of the images 110 leading the cause prediction model 142 to arrive at the cause 146. Similarly, another set of images 1050 are shown. The original image 1052 is analyzed by the cause prediction model 142 to identify the cause of damage as collision. In order to output a reason or explanation for outputting collision as the cause of damage, a layer visualization 1054 is generated to show the image portions that contribution to identifying collision as the cause of damage. Grad-CAM techniques are further applied to produce a saliency map 1056 which highlights in B/W, the pixels that contributed to identifying collision as the cause of damage. Image 1062, which may be received as part of the images 110, shows a car with a damaged front portion and the image 1064 shows an output generated via edge detection where the features/edges involved in the model decision making are provided as an explanation for selection of a cause of damage to the car. Similarly, an image 1066 of a car with a bonnet damaged due to hailstorm is shown and an explanation 1068 showing the features that enabled decision making by a model in the selection of a cause of damage is provided.

Figure 11:
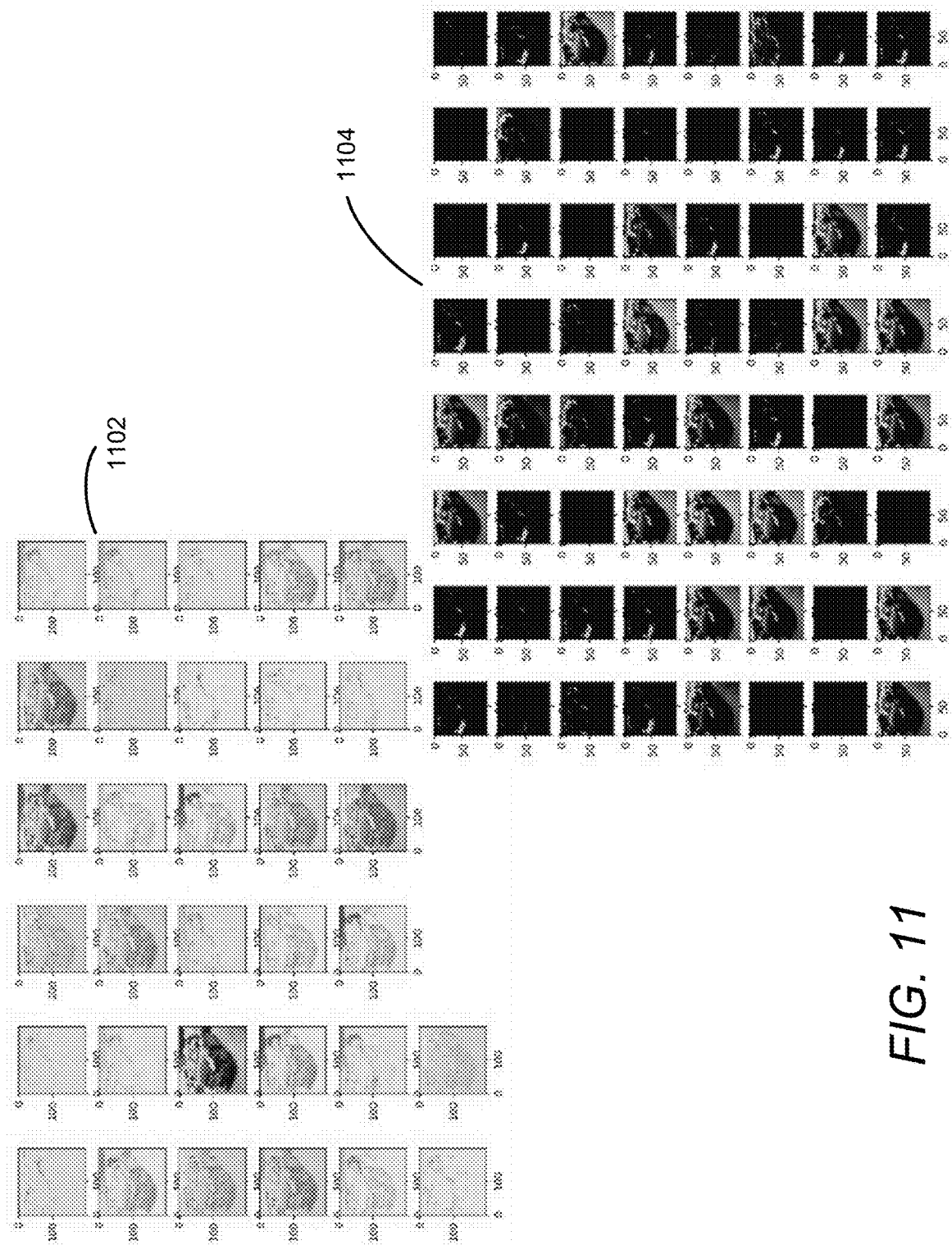
FIG. 11 shows outputs from layer visualizations of the CNN used for cause prediction in accordance with examples disclosed herein.

FIG. 11 shows outputs from layer visualizations of the cause prediction model 142 in accordance with an example. At 1102, visualizations from the first convolutional layer with 32 filters are shown. The visualizations 1102 show the correspondence between the filters and the image features captured by the filters. Similarly, visualizations 1104 from the sixth convolutional layer of the CNN which forms the cause prediction model 142 are also shown. Again, the visualizations 1104 show the correspondence between the filters and the features captured by the filters. The optimum number of visualizations to be generated can depend on the model and the dataset used for training. In an example, six convolutional layers can provide the desired accuracy for the cause prediction model 142.

Figure 12:
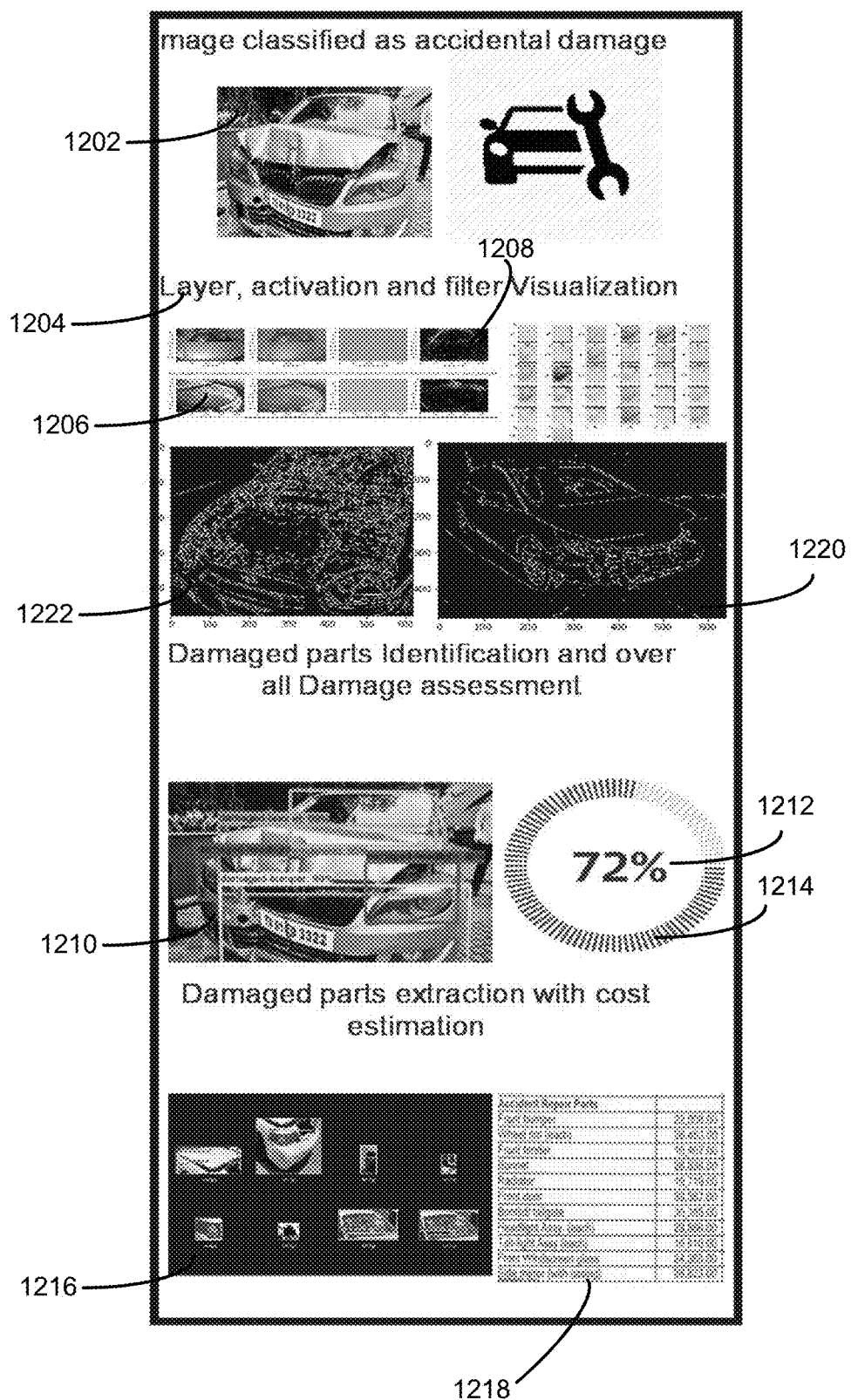
FIG. 12 shows some example outputs from different components of the automatic damage detection and estimation system in accordance with examples disclosed herein.

FIG. 12 shows some example outputs from different components of the automatic damage detection and estimation system 100. At 1202, the output from the cause prediction model 142 classifying or identifying the cause of damage as 'collision' for the damaged car in the photos is shown. At 1204, the outputs from the XAI output generator 204 showing image portions 1206 and specific pixels 1208 that contributed to the selection of collision as the damage cause are shown. Furthermore, visualizations 1222 and 1220 are generated through edge detection when identifying the cause for damage.

At 1210 the identification of specific damaged parts is shown. In fact, the extent of damage to each damaged part is also shown. For example, the bonnet is labeled as "damaged-bonnet: 99%", the headlight is labeled as "damaged-headlight 98%", bumper as "damaged-bumper: 99%", etc. However, it may be noted that windshield is labeled as "windshield: 95%". The percentage indicated in the labels represents the extent of the particular state of the part. Therefore, for the bonnet, bumper, headlights, etc., the corresponding percentages are indicative of the extent of damage whereas for the windshield, the percentage indicates that the windshield is 96% intact or not damaged. At 1212, the extent of damage to the vehicle is shown as 72% and a corresponding pie graph 1214 is also displayed. At 1216 the portions of the image received at 1202 which include the damaged parts are shown while the table at 1218 shows the cost estimation associated with the repair/restoration of the vehicle.

5. System Diagram

Figure 13:
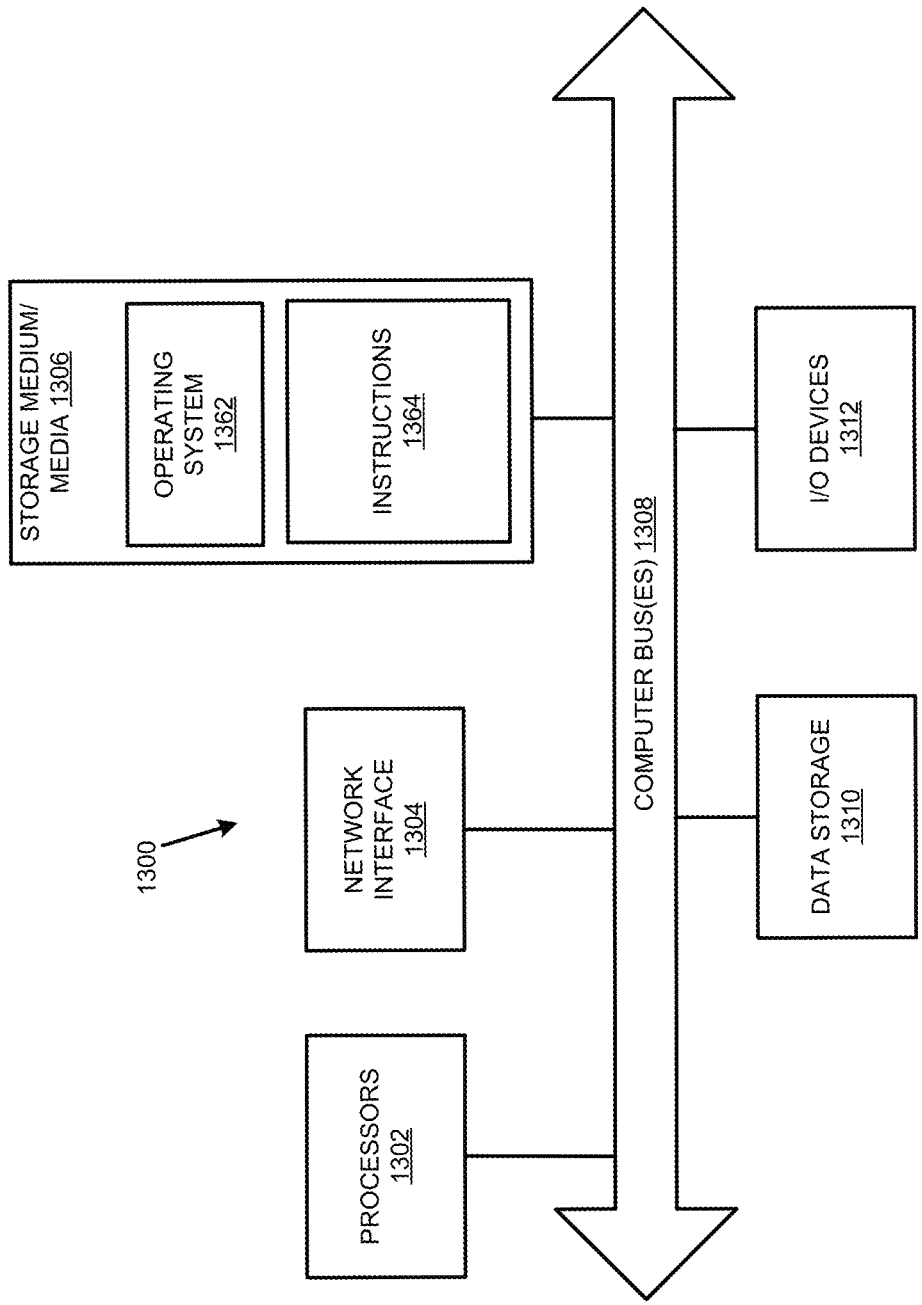
FIG. 13 illustrates a computer system that may be used to implement the automatic damage detection and estimation system in accordance with examples disclosed herein.

FIG. 13 illustrates a computer system 1300 that may be used to implement the automatic damage detection and estimation system 100. More particularly, computing machines such as desktops, laptops, smartphones, tablets and wearables which may be used to generate or access the data from the automatic damage detection and estimation system 100 may have the structure of the computer system 1300. The computer system 1300 may include additional components not shown and that some of the process components described may be removed and/or modified. In another example, a computer system 1300 can sit on external-cloud platforms such as Amazon Web Services, AZURE® cloud or internal corporate cloud computing clusters, or organizational computing resources, etc.

The computer system 1300 includes processor(s) 1302, such as a central processing unit, ASIC or other type of processing circuit, input/output devices 1312, such as a display, mouse keyboard, etc., a network interface 1304, such as a Local Area Network (LAN), a wireless 802.11x LAN, a 3G or 4G mobile WAN or a WiMax WAN, and a computer-readable or processor-readable storage medium 1306. Each of these components may be operatively coupled to a bus 1308. The processor-readable medium 1306 may be any suitable medium that participates in providing instructions to the processor(s) 1302 for execution. For example, the processor-readable medium 1306 may be non-transitory or non-volatile medium, such as a magnetic disk or solid-state non-volatile memory or volatile medium such as RAM. The instructions or modules stored on the processor-readable medium 1306 may include machine-readable instructions 1364 executed by the processor(s) 1302 to perform the methods and functions of the automatic damage detection and estimation system 100.

The automatic damage detection and estimation system 100 may be implemented as software stored on a non-transitory processor-readable medium and executed by the one or more processors 1302. For example, the processor-readable medium 1306 may store an operating system 1362, such as MAC OS, MS WINDOWS, UNIX, or LINUX, and code 1364 for the automatic damage detection and estimation system 100. The operating system 1362 may be multi-user, multiprocessing, multitasking, multithreading, real-time and the like. For example, during runtime, the operating system 1362 is running and the code for the automatic damage detection and estimation system 100 is executed by the processor(s) 1302.

The computer system 1300 may include a data storage 1313, which may include non-volatile data storage. The data storage 1310 stores any data used by the automatic damage detection and estimation system 100. The data storage 1310 may be used to store the images, the visualizations that are generated, the various object categories and associated causes used by the automatic damage detection and estimation system 100.

The network interface 1304 connects the computer system 1300 to internal systems for example, via a LAN. Also, the network interface 1304 may connect the computer system 1300 to the Internet. For example, the computer system 1300 may connect to web browsers and other external applications and systems via the network interface 1304.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. An Artificial Intelligence (AI) based automatic damage detection system, the system comprising:
   at least one processor;
   a non-transitory processor readable medium storing machine-readable instructions that cause the processor to:
   receive images of a damaged object,
   provide monochrome versions of the images to an ensemble machine learning (ML) cause prediction model,
   the ML cause prediction model trained to identify a cause of damage for the damaged object, and
   the cause of damage determined from a plurality of causes;
   identify the cause of damage to both the damaged object and one or more damaged parts of the damaged object from the plurality of causes,
   wherein the cause of damage is a source of physical damage to the damaged object, and
   the identifying performed according to the ML cause prediction model;
   obtain an explanation for the identification of the cause, the explanation obtained from the plurality of causes,
   where the explanation includes portions and pixels of the images that enabled the ML cause prediction model to identify the cause from the plurality of causes, and
   the explanation is obtained from the ML cause prediction model; and
   provide the cause of damage and the explanation for selection of the cause as an output from the ML cause prediction model.

2. The automatic damage detection system of claim 1, where to provide the monochrome version of the images the processor is to:
   generate monochrome versions of the images.

3. The automatic damage detection system of claim 1, where the ML cause prediction model includes a plurality of sub-models, where each sub-model identifies a cause of damage to a corresponding part of the one or more damaged parts of the damaged object and an output from the ML cause prediction model includes an average of outputs from the plurality of sub-models.

4. The automatic damage detection system of claim 3, where each of the plurality of sub-models includes a convolution neural network (CNN) and the processor is to:
   train the CNN via supervised learning on training data, the training data including labeled images,
   where the labeled images include images of particular portions of other damaged objects,
   the other damaged objects similar to the damaged object with the other damaged objects labeled with corresponding damage causes selected from one of the plurality of causes.

5. The automatic damage detection system of claim 4, where to train the CNN via supervised learning the processor is to:
   train the CNN on monochrome versions of the labeled images.

6. The automatic damage detection system of claim 4, where the CNN uses Rectified Linear Unit (RELU) grid-search Computer Vision (CV) activation function.

7. The automatic damage detection system of claim 4, where to obtain the explanation for the identification of the cause, the processor is to:
   generate visualizations of one or more layers of the CNN using gradient visualization techniques.

8. The automatic damage detection system of claim 7, where to provide the output, the processor is to:
   produce a coarse localization map of important regions of the images by back propagating a non-zero signal associated with the cause through the CNN; and
   create high-resolution visualizations via pointwise multiplication of the back propagating non-zero signal with the images.

9. The automatic damage detection system of claim 8, where to provide the output, the processor is to:
   generate visualizations via edge detection that show features of the images that enabled the identification of the cause from the plurality of causes.

10. The automatic damage detection system of claim 1, where the processor is to:
    identify and label damaged parts of the damaged object by providing the one or more of the images to a parts identification model, where the parts identification model is trained to further output a repair or replace decision for each of the damaged parts.

11. The automatic damage detection system of claim 10, where the parts identification model includes a Faster Region-based convolution neural network (Faster R-CNN) and where the processor is to:

train the Faster R-CNN via supervised learning with labeled images of other objects similar to the damaged object, where the labeled images included the other objects labeled with corresponding damaged and non-damaged parts.

12. The damage detection and of claim 10, the processor is to further:

connect to a database including cost estimates for repairs and replacements of the parts of the damaged object; and retrieve estimates for the damaged parts based on the repair and replace decisions.

13. The damage detection and of claim 1, wherein to identify the cause of damage to from the plurality of causes, the processor is to:

identify the cause of damage from the plurality of causes that include at least collisions, hailstorms, and natural perils.

14. A non-transitory processor-readable storage medium comprising machine-readable instructions that cause a processor to:

receive images of a damaged object associated with an object category;

provide monochrome versions of the images to an ensemble machine learning (ML) cause prediction model and an ML parts identification model, where the ML cause prediction mode includes a plurality of sub-models wherein each sub-model is trained to identify a cause of damage for a corresponding portion of the damaged object, the cause being identified from a plurality of causes associated with the object category, and the parts identification model is trained to identify and label parts and states of the parts of the damaged object from the images;

identify the cause of damage to both the damaged object and one or more damaged parts of the damaged object from the plurality of causes, wherein the cause of damage is a source of physical damage to the damaged object, and the identifying performed according to the ML cause prediction model;

obtain an explanation for the identification of the cause from the plurality of causes, where the explanation includes portions and pixels of the images that enabled the ML cause prediction model to identify the cause from the plurality of causes, and the explanation is obtained from the cause prediction model;

provide the cause of damage and the explanation for identification of the cause as an output from the ML cause prediction model;

obtain labels for the parts and the states of the parts, where the obtained labels include labels for non-damaged parts, damaged parts and repairable parts of the damaged object;

estimate an extent of damage to the damaged object based on the obtained labels for the damaged parts, the repairable parts and the non-damaged parts;

estimate a cost for restoring the damaged object; and output the estimated extent of damage, portions of images showing the damaged parts and the repairable parts, and the estimated cost of restoring the damaged object.

15. The non-transitory processor-readable storage medium of claim 14, where each of the plurality of sub-models includes a convolution neural network (CNN) trained on black and white images of portions of other damaged objects belonging to the object category of the damaged object and labeled with one of the plurality of causes.

16. The non-transitory processor-readable storage medium of claim 14, where the instructions for identifying the cause of damage further comprising instructions that cause a processor to:

identify the object category from a plurality of object categories; and select a set of the plurality of causes from various sets of causes associated with the plurality of object categories.

17. An Artificial Intelligence (AI) based automatic damage detection method, comprising:

receiving images of a damaged object;

providing monochrome versions of the images to an ensemble machine learning (ML) cause prediction model, the ML cause prediction model trained to identify a cause of damage for the damaged object, and the cause of damage determined from a plurality of causes;

identifying the cause of damage to both the damaged object and one or more damaged parts of the damaged object from the plurality of causes, wherein the cause of damage is a source of physical damage to the damaged object, and the identifying performed according to the ML cause prediction model;

obtaining an explanation for the identification of the cause, the explanation obtained from the plurality of causes, where the explanation includes portions and pixels of the images that enabled the ML cause prediction model to identify the cause from the plurality of causes, and the explanation is obtained from the ML cause prediction model; and providing the cause of damage and the explanation for selection of the cause as an output from the ML cause prediction model.

* * * * *